(12) United States Patent
Emura et al.

(10) Patent No.: US 12,504,151 B2
(45) Date of Patent: Dec. 23, 2025

(54) LIGHT-EMITTING DEVICE AND SURFACE-EMITTING LIGHT SOURCE

(71) Applicant: NICHIA CORPORATION, Anan (JP)

(72) Inventors: Keiji Emura, Anan (JP); Tsuyoshi Okahisa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 998 days.

(21) Appl. No.: 17/645,482

(22) Filed: Dec. 22, 2021

(65) Prior Publication Data

US 2022/0205614 A1 Jun. 30, 2022

(30) Foreign Application Priority Data

Dec. 24, 2020 (JP) .................................. 2020-215442

(51) Int. Cl.
*F21V 9/38* (2018.01)
*F21Y 105/16* (2016.01)
*H10H 20/851* (2025.01)

(52) U.S. Cl.
CPC ........... *F21V 9/38* (2018.02); *H10H 20/8511* (2025.01); *F21Y 2105/16* (2016.08); *H10H 20/8513* (2025.01)

(58) Field of Classification Search
CPC ......... C09K 11/06; F21V 9/38; H10K 50/125; H10F 77/496; F21Y 2105/16
See application file for complete search history.

(56) References Cited

U.S. PATENT DOCUMENTS

| 7,654,687 B2* | 2/2010 | Tsai | G02B 6/0021 |
| | | | 362/97.3 |
| 10,539,733 B2* | 1/2020 | Yamamoto | H01L 25/0753 |
| 10,578,789 B2* | 3/2020 | Ngai | F21V 5/02 |
| 2006/0099449 A1 | 5/2006 | Amano et al. | |
| 2010/0044735 A1* | 2/2010 | Oyamada | H10H 20/8513 |
| | | | 257/E33.061 |

(Continued)

FOREIGN PATENT DOCUMENTS

| JP | 2005277127 A | 10/2005 |
| JP | 2006135225 A | 5/2006 |

(Continued)

*Primary Examiner* — Mark W Tornow
*Assistant Examiner* — Priya M Rampersaud
(74) *Attorney, Agent, or Firm* — Hunton Andrews Kurth LLP

(57) ABSTRACT

A light-emitting device includes a light-emitting element, a first wavelength converting member, a second wavelength converting member, and a first light-transmissive member. The first light-transmissive member is located between the first wavelength converting member and the second wavelength converting member. The first light-transmissive member has a refractive index smaller than a refractive index of a base material of the one of the first wavelength converting member and the second wavelength converting member having a shorter peak emission wavelength than the other of the first wavelength converting member and the second wavelength converting member. Each of corresponding surfaces of lateral surfaces of the first wavelength converting member, lateral surfaces of the first light-transmissive member, and lateral surfaces of the second wavelength converting member may constitute a continuous light-emission surface.

18 Claims, 11 Drawing Sheets

(56) References Cited

U.S. PATENT DOCUMENTS

| | | |
|---|---|---|
| 2010/0237370 A1 | 9/2010 | Kim et al. |
| 2011/0019707 A1* | 1/2011 | Sato .................. H10H 20/8513 |
| | | 257/E33.059 |
| 2011/0037740 A1* | 2/2011 | Yamaguchi ....... G02F 1/133603 |
| | | 362/558 |
| 2011/0149594 A1* | 6/2011 | Terajima ........... G02F 1/133603 |
| | | 362/606 |
| 2011/0156071 A1* | 6/2011 | Cheng ................ H10H 20/8513 |
| | | 257/E33.056 |
| 2013/0140580 A1* | 6/2013 | Wirth .................. H10H 20/851 |
| | | 257/76 |
| 2013/0328100 A1 | 12/2013 | Kono et al. |
| 2015/0003043 A1* | 1/2015 | Ke ....................... G02F 1/1336 |
| | | 362/97.1 |
| 2020/0064687 A1 | 2/2020 | Imada |
| 2020/0379165 A1 | 12/2020 | Hayashi |

FOREIGN PATENT DOCUMENTS

| | | |
|---|---|---|
| JP | 2007035885 A | 2/2007 |
| JP | 2010538453 A | 12/2010 |
| JP | 2011519162 A | 6/2011 |
| JP | 2011181603 A | 9/2011 |
| JP | 2013118244 A | 6/2013 |
| JP | 2013258209 A | 12/2013 |
| JP | 2016533030 A | 10/2016 |
| JP | 2017034179 A | 2/2017 |
| JP | 2020031108 A | 2/2020 |
| JP | 2020198421 A | 12/2020 |
| WO | 2009131627 A1 | 10/2009 |
| WO | 2015013399 A1 | 1/2015 |

\* cited by examiner

LIGHT-EMITTING DEVICE AND SURFACE-EMITTING LIGHT SOURCE

CROSS-REFERENCE TO RELATED PATENT APPLICATION

The present application claims priority under 35 U. S. C. § 119 to Japanese Patent Application No. 2020-215442, filed Dec. 24, 2020, the contents of which are incorporated herein by reference in their entirety.

BACKGROUND

Technical Field

The present disclosure relates to a light-emitting device and a surface-emitting light source.

Description of Related Art

In recent years light-emitting devices having a wavelength converting material connected to a light emitting diode have been developed (see, for example Japanese Translation of PCT International Application Publication No. 2016-533030).

SUMMARY

In such light-emitting devices, an improvement in light-extracting efficiency has been desired.

An object of certain embodiments according to the present disclosure is to provide a light-emitting device having high light extraction efficiency.

A light emitting device according to an exemplary embodiment of the present includes a light-emitting element, a first wavelength converting member, a second wavelength converting member, and a first light-transmissive member. The light-emitting element is configured to emit a first light having a first peak wavelength. The first wavelength converting member is in contact with one or more lateral surfaces of the light-emitting element. The first wavelength converting member comprises a first base material and a first wavelength converting material. The first wavelength converting material is arranged in the first base material. The first wavelength converting material is configured to absorb a portion of the first light and emit a second light. The second light has a second peak wavelength that is different from the first peak wavelength. The second wavelength converting member comprises a second base material and a second wavelength converting material. The second wavelength converting material is arranged in the second base material. The second wavelength converting material is configured to absorb a portion of the first light and emit a third light. The third light has a third peak wavelength that is different from the first peak wavelength and the second peak wavelength. The first light-transmissive member is located between the first wavelength converting member and the second wavelength converting member. A refractive index of the first light-transmissive member is smaller than a refractive index of the first base material and the second peak wavelength is shorter than the third peak wavelength, or the refractive index of the first light-transmissive member is smaller than a refractive index of the second base material and the third peak wavelength is shorter than the second peak wavelength. A lateral surface of the first wavelength converting member, a lateral surface of the first light-transmissive member, and a lateral surface of the second wavelength converting member constitute a continuous light-emission surface.

A light-emitting device according to an exemplary embodiment includes a light-emitting element, a first wavelength converting member, a second wavelength converting member, a third wavelength converting member, and a first light-transmissive member. The light-emitting element is configured to emit a first light having a first peak wavelength. The first wavelength converting member is in contact with lateral surfaces of light-emitting element. The first wavelength converting member comprises a first base material and a first wavelength converting material. The first wavelength converting material is arranged in the first base material. The first wavelength converting material is configured to absorb a portion of the first light and emit a second light. The second light has a second peak wavelength that is different from the first peak wavelength. The second wavelength converting member is located on the first wavelength converting member. The second wavelength converting member comprises a second base material and a second wavelength converting material. The second wavelength converting material is arranged in the second base material. The second wavelength converting material is configured to absorb a portion of the first light and emit a third light. The third light has a third peak wavelength that is different from the first peak wavelength and the second peak wavelength. The third wavelength converting member is located above the second wavelength converting member. The third wavelength converting member comprises a third base material and a third wavelength converting material. The mentioned third wavelength converting material is arranged in the third base material. The third wavelength converting material is configured to absorbs a portion of the first light and emit a fourth light. The fourth light has a fourth peak wavelength that is different from the first peak wavelength, the second peak wavelength, and the third peak wavelength. The first light-transmissive member is located between the second wavelength converting member and the third wavelength converting member. A refractive index of the first light-transmissive member is smaller than a refractive index of the second base material and the third peak wavelength is shorter than the fourth peak wavelength, or the refractive index of the first light-transmissive member is smaller than a refractive index of the third base material and the fourth peak wavelength is shorter than the third peak wavelength. A lateral surface of the first wavelength converting member, a lateral surface of the second wavelength converting member, a lateral surface of the first light-transmissive member, and a lateral surface of the third wavelength converting member constitute a continuous light-emission surface.

A surface-emitting light source according to an exemplary embodiment includes a plurality of the light-emitting devices and a light guide plate defining a plurality of holes. Each of the plurality of the light-emitting devices is located within each of the plurality of holes.

According to certain embodiments, a light-emitting device and a surface-emitting light source with high light extraction efficiency can be provided.

DETAILED DESCRIPTION

Figure 1A:
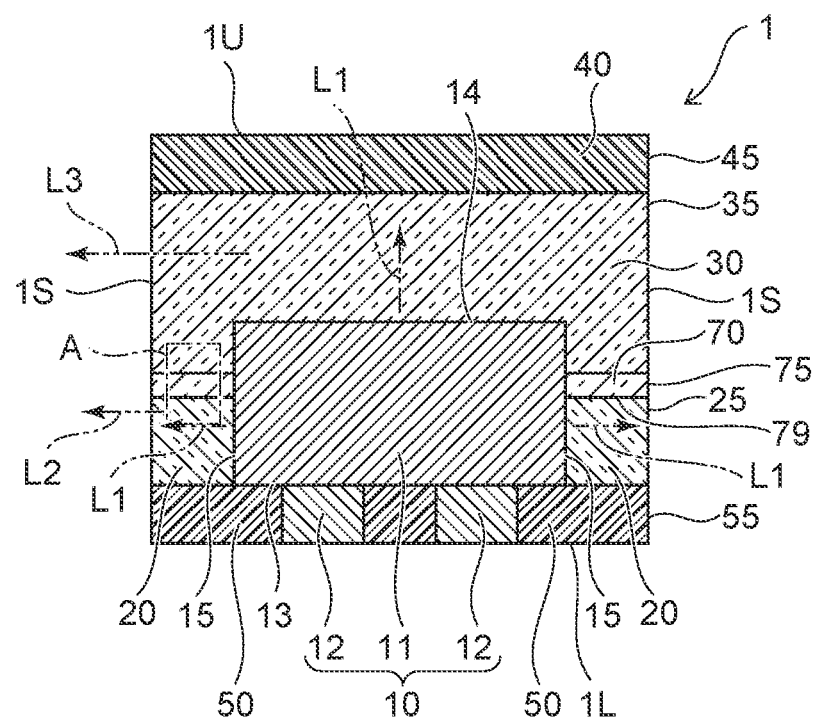
FIG. 1A is a schematic exemplary cross-sectional view showing an exemplary light-emitting device according to a first embodiment of the present disclosure.

Certain embodiments will be described below with reference to the drawings. The embodiments shown below are to exemplify a light-emitting device and a surface-emitting light source to give a concrete form to technical ideas of the present disclosure, and the scope of the invention is not limited to those embodiments described below. For example, numeral values, shapes, materials, steps of manufacturing, and the orders of the steps shown in the embodiments are given as examples and can be variously modified appropriately. Each of the embodiments described below can be variously combined appropriately.

The sizes and the shapes of the components in the drawings are occasionally shown exaggerated for ease of understanding, and may not represent actual dimensions and/or shapes in the actual and/or relationships between the sizes of the components in the actual lead frame and/or light emitting device. For example, the same component may have different aspect ratios between drawings. Also, in order to avoid excessively complicating drawings, one or more configuration components may not be shown in some drawings.

First Embodiment

Figure 1B:
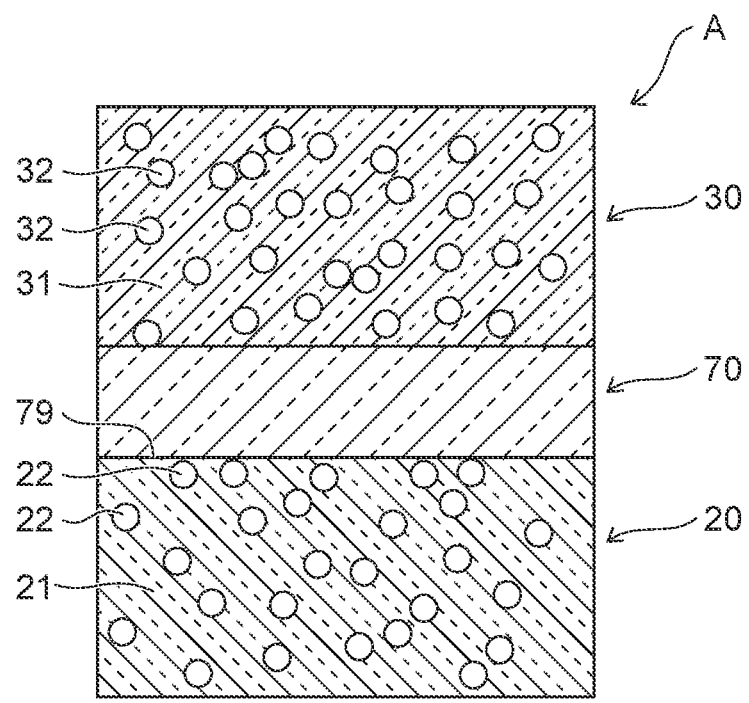
FIG. 1B is an enlarged cross-sectional view of a region A of FIG. 1A.

Configuration of an exemplary light-emitting device 1 according to a first embodiment will be described. FIG. 1A is a schematic exemplary cross-sectional view showing an exemplary light-emitting device according to the first embodiment. FIG. 1B is an enlarged cross-sectional view of a region A of FIG. 1A. As shown in FIG. 1A, the light-emitting device 1 according to the first embodiment has an approximately rectangular parallelepiped shape. In other words, the light-emitting device 1 has a lower surface 1L, an upper surface 1U, and four lateral surfaces 1S located between the lower 1L and the upper surface 1U. The light-emitting device 1 includes a light-emitting element 10, a first wavelength converting member 20, a first light-transmissive member 70, a second wavelength converting member 30, a first light-reflecting member 40, and a covering member 50.

The light emitting element 10 includes a semiconductor layered structure 11, and positive and negative electrodes 12 electrically connected to the semiconductor layered structure 11. The semiconductor layered structure 11 has, for example, a rectangular parallelepiped shape. In the semiconductor layered structure 11, at least a p-type semiconductor layer, a light-emitting layer, and an n-type semiconductor layer are layered. One of the electrodes 12 is connected to the p-type semiconductor layer of the semiconductor layered structure 11 and the other electrode 12 is connected to the n-type semiconductor layer of the semiconductor layered structure 11. The material of the electrodes 12 contains, for example, silver (Ag) or copper (Cu). The electrodes 12 can be single layer or multiple layers of different metal layers.

In the present specification, a direction from the positive and negative electrodes 12 toward the semiconductor layered structure 11 is referred to as "up" and the opposite direction is referred to as "down", but those expressions are for the sake of convenience and are independent of the direction of gravity. The directions perpendicular to the "up" and "down" directions may also be referred to as a "horizontal direction". Further, in the present specification, the term "plan view" refers to a view of an object from above, or from below.

The light emitting element 10 includes a lower surface 13 on which positive and negative electrodes 12 are disposed (i.e., electrode forming surface), an upper surface 14 located on a side opposite from the lower surface 13, and lateral surfaces 15 located between the lower surface 13 and the upper surface 14. When the semiconductor layered structure 11 has a rectangular parallelepiped shape, four lateral surfaces 15 are present. The light-emitting element 10 is configured to emit a first light L1 having a first peak wavelength. The first peak wavelength is, for example, in the visible light region. The first peak wavelength is, for example, in the blue region. The first peak wavelength can be in the visible light region other than the blue region, or can be in the ultraviolet region.

The first wavelength converting member 20 is in contact with a lower portion of lateral surfaces 15, that is, a region near the lower surface 13, of the light-emitting element 10. When the semiconductor layered structure 11 of the light emitting element 10 includes semiconductor layers including a light-emitting layer and a light-transmissive substrate (for example, sapphire), and the light-transmissive substrate is located on the semiconductor layers including the light-emitting layer, the first wavelength converting member 20 is in contact with the semiconductor layers including the light-emitting layer and a portion of the light-transmissive substrate. The first wavelength converting member 20, the second wavelength converting member 30 and the first light-transmissive member 70 may be directly in contact with the light emitting element 10 or joined via an adhesive layer.

As shown in FIG. 1A and FIG. 1B, the first wavelength converting member 20 may include a light-transmissive base material (first base material) 21 that contains a wavelength converting material (first wavelength converting material) 22. The wavelength converting material 22 is, for example, a fluorescent material. The wavelength converting material 22 is configured to absorb at least a portion of a first light L1 having a first peak wavelength emitted from the light-emitting element 10 and emit a second light L2 having a second peak wavelength that is different from the first peak wavelength. The second peak wavelength is, for example, in the green region. The wavelength converting material 22 is, for example, a β-sialon-based fluorescent material (for example, $(Si, Al)_3(O, N)_4:Eu$).

The first transmissive member 70 is disposed on the first wavelength converting member 20. The first transmissive member 70 is in contact with the first wavelength converting member 20. The first light-transmissive member 70 is in contact with portions of the lateral surfaces 15 of the light emitting element 10, which are located spaced apart from the lower surface 13 and the upper surface 14 of the light-emitting element 10.

The second wavelength converting member 30 is disposed on the light-emitting element 10 and on the first light-transmissive member 70. The second wavelength converting member 30 is in contact with the first light-transmissive member 70. Also, the second wavelength converting member 30 is in contact with portions of the lateral surfaces 15 of the light-emitting element 10 which are located near the upper surface 14, and with the upper surface 14 of the light emitting element 10. The second wavelength converting member 30 includes a base material (second base material) 31 of a light-transmissive resin, and a wavelength converting material (second wavelength converting material) 32 contained in the base material 31. The wavelength converting material 32 is, for example, a fluorescent material. The wavelength converting material 32 is configured to absorb at least a portion of the first light L1 having a first peak wavelength emitted from the light-emitting element 10 and emit a third light L3 having a third peak wavelength that is different from the first peak wavelength and second peak wavelength. The third peak wavelength is, for example, in the red region. The wavelength converting material 32 is, for example, a CASN-based fluorescent material (for example, $CaAlSiN_3:Eu$). The wavelength converting material 32 of the second wavelength converting member 30 may absorb a portion of the second light L2.

As described above, the first light-transmissive member 70 is located between the first wavelength converting member 20 and the second wavelength converting member 30. The first light-transmissive member 70 may be formed of a material including a light-transmissive resin material and does not substantially contain a wavelength converting material. In the present specification, the expression "does not substantially contain" refers to an unintended inclusion, for example, in the manufacturing of the light-emitting device 1, an inevitable mixing of the wavelength converting material 22 of the first wavelength converting member 20 or the wavelength converting material 32 of the second wavelength converting member 30, which is regarded acceptable.

The first light-transmissive member 70 has a refractive index lower than a refractive index of the base material 21 of the first wavelength converting member 20, or a refractive index of the base material 31 of the second wavelength converting member 30, which emits light with a shorter peak wavelength. For example, when the second light L2 emitted by the first wavelength converting member 20 is green and the third light L3 emitted by the second wavelength converting member 30 is red, the second peak wavelength of the second light L2 is shorter than the third peak wavelength of the third light L3. In this case, the refractive index of the first light-transmissive member 70 is lower than the refractive index of the base material 21 of the first wavelength converting member 20. Conversely, when the second light L2 is red and the third light L3 is green, the third peak wavelength of the third light L3 is shorter than the second peak wavelength of the second light L2. In this case, the refractive index of the first light-transmissive member 70 is lower than the refractive index of the base material 31 of the second wavelength converting member 30.

The first light-reflecting member 40 is disposed on the second wavelength converting member 30 and at least above the light-emitting element 10. In the example illustrated in FIG. 1A, the first light-reflecting member 40 is located on the second wavelength converting member 30 and above the light-emitting element 10. The first light-reflecting member 40 is configured to reflect a portion of the first light L1, a portion of the second light L2, and a portion of the third light L3. Also, the first light-reflecting member 40 is configured to partially transmit a different portion of the first light L1, a different portion of the second light L2, and a different portion of the third light L3. The first light-reflecting member 40 includes, for example, a base material formed of a resin material and a light diffusing material contained in the base material.

The covering member 50 covers the lower surface 13 of the light emitting element 10 except for portions of the lower surface 13 corresponding to the electrodes 12, the covering member 50 also covers lateral surfaces of the electrodes 12 and a lower surface of the first wavelength converting member 20. For example, the covering member 50 has light reflectivity. For example, the covering member 50 contains a light diffusing material in the base material formed of a resin material. The presence of the covering member 50 allows light emitted from the light emitting element 10 to the lower surface 13 side to be reflected by covering member 50, thereby increasing the light extraction efficiency of the light emitting element 10. The covering member 50 may be optionally provided.

Of the surfaces of the light emitting element 10, the lower surfaces of electrodes 12 are exposed at the lower surface 1L of the light-emitting device 1. The surfaces of the light-emitting element 10 other than the lower surfaces of the electrodes 12 are covered by the covering member 50, the first wavelength converting member 20, the first light-transmissive member 70, and the second wavelength converting member 30. The upper surface 1U of the light-emitting device 1 is constituted by the upper surface of the first light-reflecting member 40. The lower surface 1L of the light-emitting device 1 is constituted by the lower surface of the covering member 50 and the lower surfaces of the positive and negative electrodes 12. The lateral surfaces 1S of the light-emitting device 1 are constituted by corresponding surfaces of lateral surfaces 55 of the covering member 50, lateral surfaces 25 of the first wavelength converting member 20, lateral surfaces 75 of the first light-transmissive member 70, lateral surfaces 35 of the second wavelength converting member 30, and lateral surfaces 45 of the first light-reflecting member 40.

Accordingly, the corresponding surfaces of the lateral surfaces 25 of the first wavelength converting member 20, the lateral surfaces 75 of the first light-transmissive member 70, and the lateral surfaces 35 of the second wavelength converting member 30 constitute continuous light-emitting surfaces. The term "continuous" means that the boundaries of the corresponding lateral surfaces are substantially flat, with no steps formed between the boundaries.

The light-emitting device 1 can have a metal film on each of the lower surfaces of the positive and negative electrodes 12. In such a case, the metal film preferably covers the lower surfaces of the electrodes 12, as well as the lower surfaces of the covering member 50 around the lower surfaces of the electrodes 12. In other words, it is preferable that the lower surface of the metal film has an area greater than an area of the lower surface of a corresponding one of the electrodes 12. With this arrangement, a good electrical connection can be obtained between the light-emitting device 1 and the wiring substrate on which the light-emitting device 1 is mounted. The metal film can be formed as shown below. The metal film is disposed by sputtering on the lower surfaces of the electrodes 12 and the lower surface of the covering member 50. Then, the metal film is partially removed by laser ablation so that the electrodes 12 are electrically separated from each other. As another example, applying a mask with openings corresponding to the lower surfaces of the electrodes 12 and predetermined portion of the lower surface of the covering member 50, and disposing an electrically conductive paste in the regions with the openings, then removing the mask.

Next, a method of manufacturing the light-emitting device 1 according to a first embodiment will be described. FIG. 2A through FIG. 2H are schematic cross-sectional views illustrating a method of manufacturing the light-emitting device 1 according to the first embodiment.

Figure 2A:
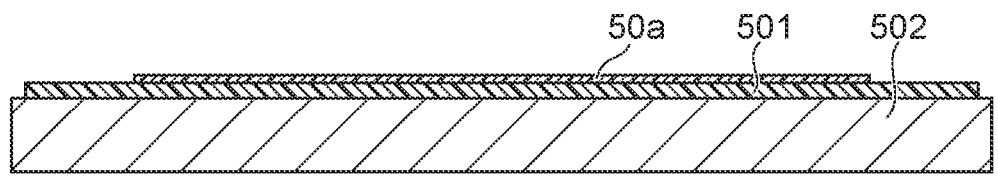
FIG. 2A through FIG. 2H are schematic exemplary cross-sectional views illustrating an exemplary method of manufacturing a light-emitting device according to the first embodiment.

As shown in FIG. 2A, a sheet 501, for example, formed of a resin material is provided, and a light-reflecting resin layer 50a is disposed on the sheet 501. The light-reflecting resin layer 50a can be disposed by application of a coating. At this state, the light-reflecting resin layer 50a can be in an uncured state or in a semi-cured state. Then the lower surface of the sheet 501 is attached on the plate 502.

Figure 2B:
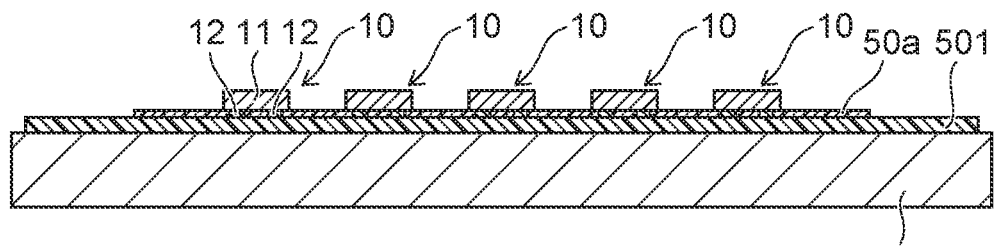

Thereafter, as shown in FIG. 2B, a plurality of light emitting elements 10 are disposed on the light-reflecting resin layer 50a with the electrodes 12 facing the light-reflecting resin layer 50a. The light emitting elements 10 are allowed to settle onto the light-reflecting resin layer 50a or the light-emitting elements 10 are pushed toward the light-reflecting resin layer 50a. Accordingly, the electrodes 12 of the light-emitting elements 10 are placed in the light-reflecting resin layer 50a. At this time, the electrodes 12 of the light-emitting element 10 are surrounded by the light-reflecting resin layer 50a. Thereafter, for example, heat treatment is performed to cure the light-reflecting resin layer 50a. The heat treatment to cure the resin includes, for example, heating at a temperature in a range of 60 to 130° C., in an oven.

Figure 2C:
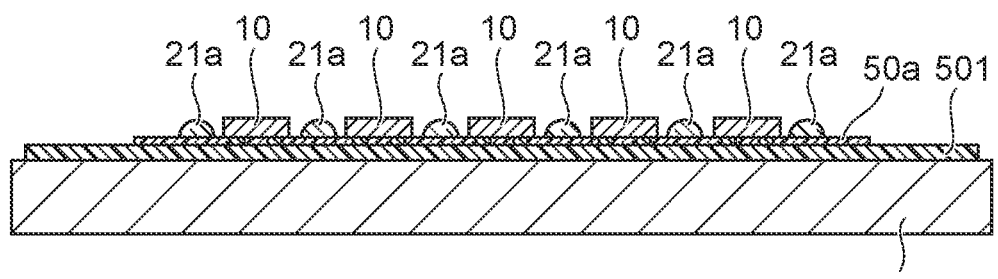

Thereafter, as shown in FIG. 2C, a resin material 21a containing the wavelength converting material 22 is disposed on the light-reflecting resin layer 50a and between the light emitting elements 10. The resin material 21a surrounds each of the light-emitting elements 10 in a plan view. At this state, the resin material 21a can be in an uncured state or in a semi-cured state. The supply quantity of the resin material 21 is determined such that when the supplied resin material 21a is flattened, an upper surface of the resin material 21a is lower than the upper surfaces 14 of the light-emitting elements 10.

Figure 2D:
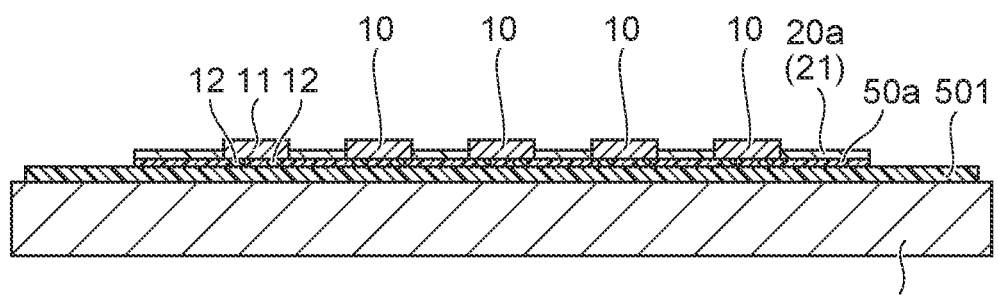

Thereafter, as shown in FIG. 2D, the resin material 21a is flattened. As a result, the regions near the electrode forming surface (lower surface 13) of the lateral surfaces of the semiconductor layered structure 11 of each of the light-emitting elements 10 are covered by the resin material 21a and regions near the upper surface 14 are exposed to the outside. The upper surfaces 14 of the light-emitting elements 10 are also exposed to the outside. Thereafter, the resin material 21a is cured by, for example, heat treatment. With this, the first wavelength converting layer 20a is formed. In the first wavelength converting layer 20a, the base material 21 of the hardened resin 21a contains the wavelength converting material 22. Portions of the semiconductor layered structure 11 of each of the light-emitting elements 10, near the electrode forming surface are surrounded by the first wavelength converting layer 20a. The flattening of the uncured or semi-cured resin material 21a can be obtained by allowing the resin 21a to wet spread, or vibrating the plate 502 to wet spread the resin material 21a, or leveling the surface of the resin material 21a using a jig, etc. In the present specification, the term "flattening" means that not only the entire upper surface of the resin material 21a becomes flat, but also that a center portion of the upper surface of the resin material 21a becomes flat while the end portions of the upper surface of the resin material 21a located near each of the light-emitting elements 10 rose up.

Figure 2E:
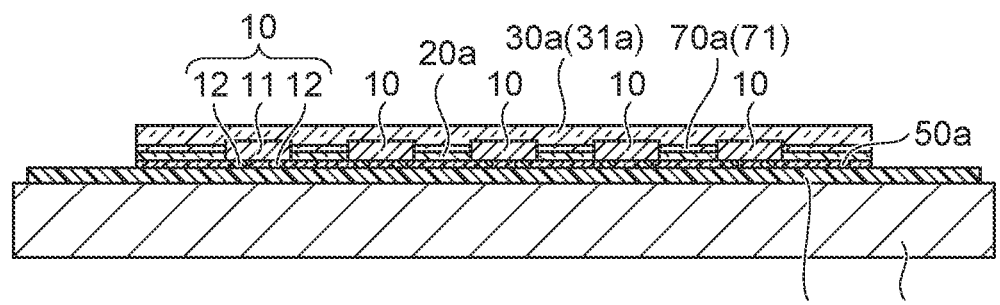

Thereafter, as shown in FIG. 2E, a resin material 71 is disposed on the first wavelength converting layer 20a between the light-emitting elements 10. The resin material 71 is light-transmissive and does not contain any wavelength converting material. At this stage, the resin material 71 can be in an uncured state or in a semi-cured state. The supply quantity of the resin material 71 is determined such that when the supplied resin material 71 is flattened, an upper surface of the resin material 71 is lower than the upper surfaces 14 of the light-emitting elements 10. Thereafter, the resin material 71 is flattened. Thereafter, the resin material 71 is cured by, for example, heat treatment. With this, the first low refractive index layer 70a is formed on the first wavelength converting layer 20a. The first low refractive index layer, 70a surrounds a middle portion of the semiconductor layered structure 11 in an up-down direction. The upper surfaces 14 of the light emitting elements 10 are exposed to the outside.

Thereafter, the resin material 31a containing a wavelength converting material 32 is disposed on the first low refractive index layer 70a. At this stage, the resin material 31a can be in an uncured state or in a semi-cured state. The resin material 31a is disposed to embed the light-emitting elements 10. Thereafter, the resin material 31a is cured by, for example, heat treatment. With this, the second wavelength converting layer 30a is formed on the first low refractive index layer 70a. In the second wavelength converting layer 30a, a wavelength converting material 32 is contained in the base material 31, which is the cured resin material 31a. The regions near the upper surface 14 of the lateral surfaces of the semiconductor layered structure 11 of each of the light-emitting elements 10 (i.e., regions not covered by the first wavelength converting layer 20a and the first low refractive index layer 70a) and the upper surface 14 of each of the light-emitting element 14 are covered by the second wavelength converting layer 30a.

Figure 2F:
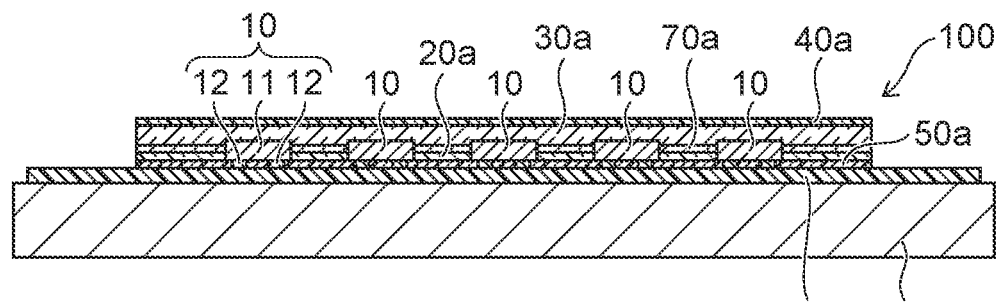

Thereafter, as shown in FIG. 2F, a resin material containing a light diffusing material is disposed on the second wavelength converting layer 30a. Thereafter, the resin material is cured by, for example, heat treatment. With this, the first light-reflecting layer 40a is formed. Thus, the light-reflecting resin layer 50a, the first wavelength converting layer 20a, the first low refractive index layer 70a, the second wavelength converting layer 30a, and the first light-reflecting layer 40a are layered, and a structure 100 containing a plurality of light-emitting elements 10 is constructed.

Figure 2G:
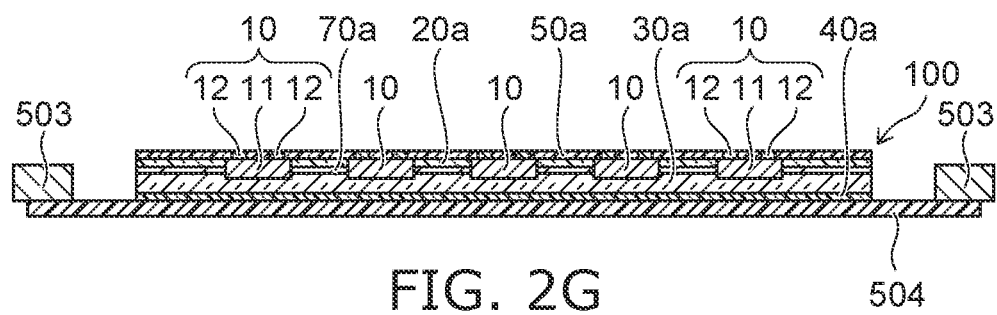

Thereafter, as shown in FIG. 2G, a support with a sheet 504 attached on the ring 503 is provided. Thereafter, by attaching the first light-reflecting layer 40a to the sheet 504, the structure 100 is transferred from the sheet 501 to the sheet 504. At this time, the upper side and the lower side of the structure 100 are reversed, and the light-reflecting resin layer 50a is exposed upward. Thereafter, by grinding the light-reflecting resin layer 50a, the surfaces of the electrodes 12 of the light-emitting elements 10 are exposed from the light-reflecting resin layer 50a.

Figure 2H:
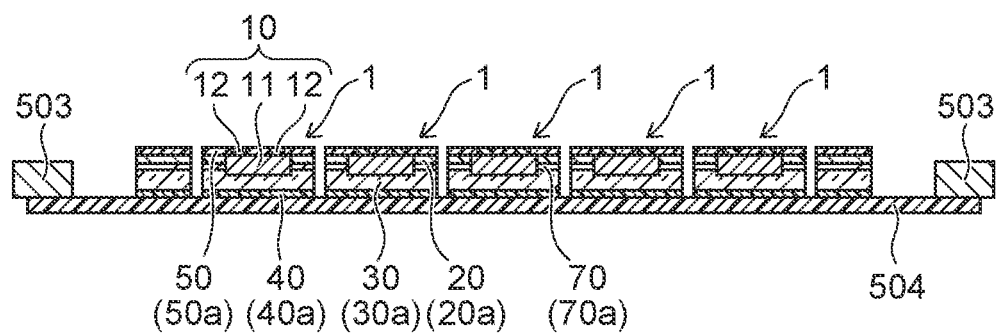

Thereafter, as shown in FIG. 2H, the portions of the structure 100 between adjacent light-emitting elements 10 are cut. When the structure 100 includes the light-emitting elements 10 that are arranged in two dimensions, the structure 100 is cut by forming a grid-like groove. Accordingly, the structure 100 can be separated into single light-emitting elements 10, and thus a plurality of light-emitting devices 1 having a rectangular shape in a top view can be manufactured. At this time, the light-reflecting resin layer 50a is divided into the covering members 50, the first wavelength converting layer 20a is divided into the first wavelength converting members 20, the first low refractive index layer 70a is divided into the first light-transmissive members 70, the second wavelength converting layer 30a is divided into the second wavelength converting members 30, and the first light-reflecting layer 40a is divided into the first light-reflecting members 40. In the first embodiment, a single light-emitting element 10 is included in a single light-emitting device 1, but a plurality of light-emitting elements may be included in a single light-emitting device.

Next, operation of the light emitting device 1 according to the first embodiment will be described below. When power is supplied to the light-emitting element 10 of the light-emitting device 1 via a wiring board, the light-emitting element 10 emits the first light L1. A portion of the first light L1 enters the first wavelength converting member 20 and is converted to the second light L2 by the wavelength converting material 22. A portion of different portion of the first light L1 enters the first light-transmissive member 70, propagates within the first light-transmissive member 70, and is radiated from the lateral surfaces 75 of the first light-transmissive member 70 to the outside of the light-emitting device 1. A portion of different portion of the first light L1 enters the second wavelength converting member 30 and is converted to the third light L3 by the wavelength converting material 32. A portion of different portion of the first light L1 passes through the first wavelength converting member 20 or the second wavelength converting member 30 and is emitted to the outside of the light-emitting device 1. The most portion of the second light L2 is emitted from the lateral surfaces 25 of the first wavelength converting member 20 to the outside of the light-emitting device 1. The most portion of the third light L3 is emitted from the lateral surfaces 35 of the second wavelength converting member 30 to the outside of the light-emitting device 1. A portion of light that is transmitted through the second wavelength converting member 30 and reached the first light-reflecting member 40 is reflected at the first light-reflecting member 40, which decrease the emission of light from the upper surface 1U of the light-emitting device 1, and increases the emission of light from the lateral surfaces 1S of the light-emitting device 1.

When the refractive index of the first light-transmissive member 70 is lower than the refractive index of the base material 21 of the first wavelength converting member 20, the light entering the first light-transmissive member 70 from the first wavelength converting member 20 is refracted at an interface 79 between the first wavelength converting member 20 and the first light-transmissive member 70 with an emission angle greater than the angle of incidence. As a result, propagation direction of the light entering the first wavelength converting member 20 into the first light-transmissive member 70 approaches a horizontal direction. Light from the first wavelength converting member 20 entering the interface 79 at an angle of incidence greater than a critical angle is totally reflected at the interface 79. The light totally reflected at the interface 79 tends not to enter the first light-transmissive member 70, but tends to propagate in a lateral direction in the first wavelength converting member 20. This will also increase the amount of light emitted from the lateral surfaces 1S of the light-emitting device 1.

Accordingly, a mixture of the first light L1, the second light L2, and the third light L3 is emitted from the light-emitting device 1. For example, the first light L1 is a blue light, the second light L2 is a green light, the third light L3 is a red light, and a mixture of those light is a white light. Further, light from the upper surface 1U of the light-emitting device 1 is decreased, and light from the lateral surfaces 1S is increased, thus facilitating obtaining of a batwing light distribution. In the present specification, the term "batwing light distribution" refers to, in a broader sense, a light distribution defined by an emission intensity distribution that exhibiting greater emission intensities at angles with absolute values of light distribution angle greater than 0°, with respect to the optical axis perpendicular to the upper surface of the light-emitting element as 0°.

Next, effects of the first embodiment will be described. In the light-emitting device 1 according to the first embodiment, the first wavelength converting member 20 is in contact with the lateral surfaces 15 of the light-emitting element 10. Accordingly, a portion of the first light L1 emitted from the light-emitting element 10 directly enters the first wavelength converting member 20, and a portion of the entered light is converted to the second light L2 by the wavelength converting material 22. Therefore, the conversion efficiency from the first light L1 to the second light L2 is high.

Similarly, the second wavelength converting member 30 is in contact with the regions of the lateral surfaces of the semiconductor layered structure 11 of the light-emitting element 10, which are not covered by the first wavelength converting member 20 and the first light-transmissive member 70, and also in contact with the upper surface 14 of the light-emitting element 10. Accordingly, a portion of the first light L1 emitted from the light-emitting element 10 directly enters the second wavelength converting member 30, and a portion of the entered light is converted to the third light L3 by the wavelength converting material 32. Therefore, the conversion efficiency from the first light L1 to the third light L3 is also high.

In the light-emitting device 1, the first wavelength converting member 20, the first light-transmissive member 70, and the second wavelength converting member 30 are exposed at the lateral surfaces 1S. Accordingly, a portion of the first light L1 emitted from the light emitting-element 10 is emitted in the lateral directions of the light-emitting device 1 through the first light-transmissive member 70, without passing through the first wavelength the first wavelength converting component 20 and the second wavelength converting component 30. A portion of the first light L1 is emitted to the outside of the light-emitting device 1 without being scattered by the first wavelength converting member 20 and the second wavelength converting member 30.

Further, a portion of the second light L2 generated in the first wavelength converting member 20 is emitted from the lateral surfaces 1S of the light-emitting device 1 in the lateral directions of the light-emitting device 1, without passing through the second wavelength converting member 30. Accordingly, the second light L2 is not significantly scattered by the second wavelength converting member 30. Further, a portion of the third light L3 generated in the second wavelength converting member 30 is also emitted from the lateral surfaces 1S of the light-emitting device 1 in the lateral directions of the light-emitting device 1 without passing through the first wavelength converting member 20. Therefore, the third light L3 is not significantly scattered by the first wavelength converting member 20.

As described above, in light-emitting device 1, the wavelength converting members are not located or only a single layer of a wavelength converting member is located in the horizontal direction of the light-emitting element 10, such that a length from the light-emitting element 10 to the lateral surfaces 1S of the light-emitting device 1 is shorter compared to a case in which two or more layers of the wavelength converting members overlap in the horizontal direction of the light-emitting element 10. Accordingly, light is not significantly scattered. Further, a portion of the light emitted from the light-emitting element 10 and reached the light-reflecting member 40 is scattered by the light-reflecting member 40. A portion of the scattered light is emitted from the lateral surfaces 1S of the light-emitting device 1. As a result, a high extraction efficiency of the first light L1, the second light L2, and the third light L3 from the lateral surfaces of the light-emitting device 1 is exhibited. Further, the first light-transmissive member 70 is located between the first wavelength converting member 20 and the second wavelength converting member 30, so that the second light L2 (for example, green light) and the third light L3 (for example, red light) can be optically separated and extracted to the outside of the light-emitting device 1.

In the light emitting device 1, when the refractive index of the first light-transmissive member 70 is lower than the refractive index of the base material 21 of the first wavelength converting member 20, light is refracted at the interface 79 between the first wavelength converting member 20 and the first light-transmissive member 70 so that an emission angle is greater than an incident angle. Accordingly, light entering from the first wavelength converting member 20 into the first light-transmissive member 70 tends to travel in lateral directions. This also increases the extraction efficiency of the light from the lateral surfaces 1S of the light-emitting device 1.

Further, a portion of the light propagating from the first wavelength converting member 20 to the first light-transmissive member 70 is totally reflected at the interface 79 and returned into the first wavelength converting member 20. This reduces or prevents the second light L2 emitted from the first wavelength converting member 20 from entering the second wavelength converting member 30. As a result, for example, a green light of the second light L2 can be reduced or prevented from being absorbed by the wavelength converting material 32 of the second wavelength converting member 30 (for example, a CASN-based fluorescent material). This improves the light extraction efficiency of the second light L2 such that a decrease in the second light L2 in light emitted from the light-emitting device 1 to the outside can be avoided.

The refractive index of the first light-transmissive member 70 can be smaller than both the refractive index of the base material 21 of the first wavelength converting member 20 and the refractive index of the base material 31 of the second wavelength converting member 30. With this arrangement, light propagating from the first wavelength converting member 20 toward the first light-transmissive member 70, and also light propagating from the second wavelength converting member 30 toward the first light-transmissive member 70, are readily totally reflected at the interface with the first light-transmissive member 70. As a result, the light extraction efficiency is further improved. Further, light progressing from the first wavelength converter member 20 toward the first light-transmissive member 70, and from the second wavelength converter member 30 toward the first light-transmissive member 70 can be optically separated and extracted to the outside of the light-emitting device 1.

In the example illustrated in the first embodiment, a pi-sialon-based fluorescent material is used as the wavelength conversion material 22 of the first wavelength converting member 20, and a CASN-based fluorescent material is used as the wavelength conversion material 32 of the second wavelength converting member 30, but other appropriate combination of fluorescent materials can also be used.

For example, a CASN-based fluorescent material can be used as the wavelength converting material 22 of the first wavelength converting member 20 and a β-sialon-based fluorescent material can be used as the wavelength converting material 32 of the second wavelength converting member 30. In this case, the second light L2 emitted by the first wavelength converting member 20 is red light, and the third light L3 emitted by the second wavelength converting member 30 is green light.

In the light-emitting device 1, in place of a CASN-based fluorescent material, a fluoride fluorescent material such as a KSF-based fluorescent material (for example, $K_2SiF_6$:Mn) or a KSAF-based fluorescent material (for example, $K_2(Si, Al)F_6$:Mn) can be used as the wavelength converting material 32 of the second wavelength converting member 30. In the first embodiment, the second wavelength converting member 30 is spaced apart from the electrodes 12 via the first light-transmissive member 70, the first wavelength converting member 20, and the covering member 50. Accordingly, when the light-emitting device 1 is operated in a high temperature, and a release of potassium ions and fluorine ions contained in the KSF-based fluorescent material occur, reaching of those ions to the electrodes 12 can be reduced or prevented. Accordingly, migration of the metal ions contained in the electrodes 12 can be reduced or prevented, and thus corrosion of the electrodes 12 can be reduced or prevented. The second wavelength converting member 30 is spaced apart from the interface between the semiconductor layered structure 11 and the covering member 50. With this arrangement, spreading of the potassium ions and fluorine ions through the interface between the semiconductor layered structure 11 and the covering member 50 and reaching the electrodes 12 can be reduced or prevented, and thus corrosion of the electrodes 12 can be reduced or prevented. Accordingly, the light-emitting device 1 can exhibit a high reliability.

Further, in place of a β-sialon-based fluorescent material, a YAG (Yttrium Aluminum Garnet)-based fluorescent material can be used as the wavelength converting material 22 of the first wavelength converting member 20. In this case, the second peak wavelength of the second light L2 is in the yellow region. It is also possible to use a CASN-based fluorescent material as the wavelength converting material 22 of the first wavelength converting member 20, and a YAG-based fluorescent material as the wavelength converting material 32 of the second wavelength converting member 30.

Second Embodiment

Figure 3:
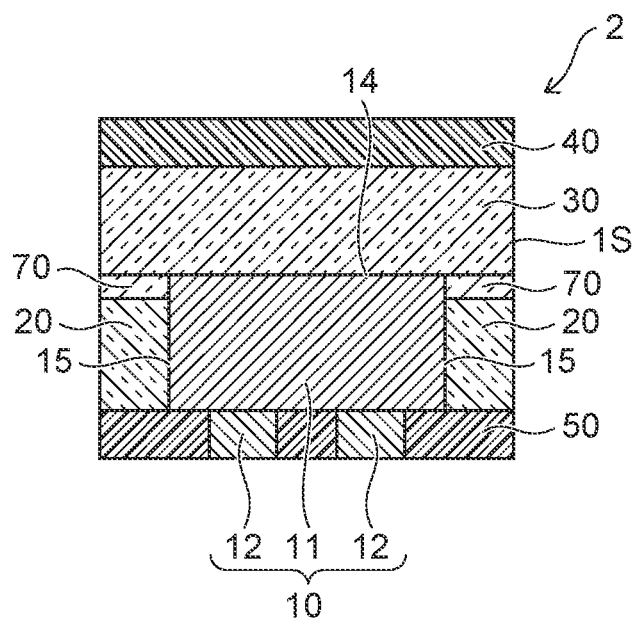
FIG. 3 is a schematic exemplary cross-sectional view showing an exemplary light-emitting device according to a second embodiment of the present disclosure.

FIG. 3 is a schematic exemplary cross-sectional view showing an exemplary light-emitting device according to a second embodiment. The differences from the first embodiment will be mainly described below. Other than the structures, operations, and effects described below, the second embodiment is similar to those in the first embodiment described above. The above will be applied in a similar manner to other embodiments.

As shown in FIG. 3, in the light-emitting device 2 according to the second embodiment, the first wavelength converting member 20 and the first light-transmissive member 70 are collectively in contact with approximately entire portions of the lateral surfaces 15 of the light-emitting element 10. The second wavelength converting member 30 is in contact with the upper surface 14 of the light-emitting element 10.

Figure 4A:
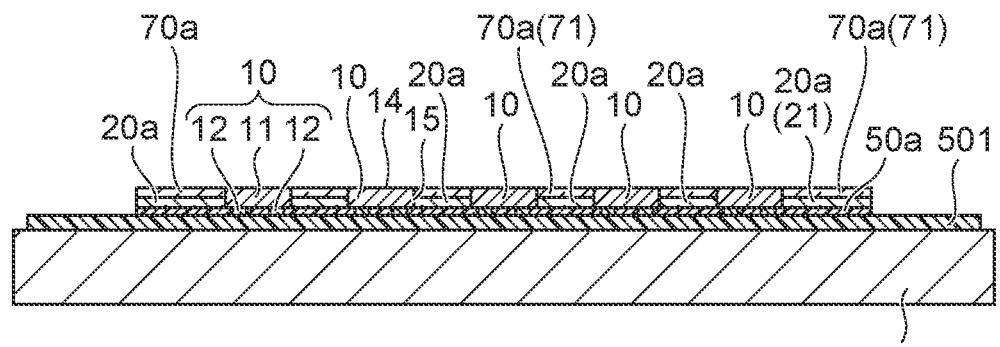
FIG. 4A and FIG. 4B are schematic exemplary cross-sectional views illustrating an exemplary method of manufacturing a light-emitting device according to the second embodiment.
Figure 4B:
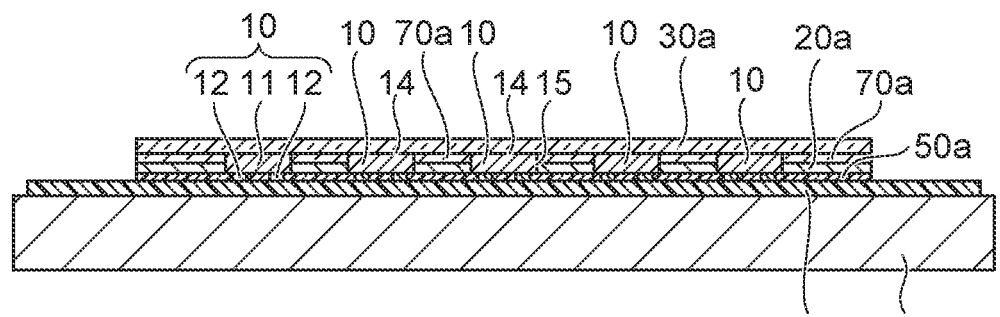

Next, a method of manufacturing the light-emitting device 2 according to the second embodiment will be described. FIG. 4A and FIG. 4B are schematic cross-sectional views illustrating a method of manufacturing the light-emitting device 2 according to the second embodiment. Steps illustrated in FIG. 2A to FIG. 2D in the first embodiment are carried out. In the second embodiment, the amount of the resin material 21a is greater than that of the first embodiment, to an amount sufficient to an amount such that when the supplied resin material 21a is flattened, the upper surface of the resin material 21a will be lower than the upper surface 14 of light-emitting element 10.

Thereafter, as shown in FIG. 4A, the resin material 71 is disposed on the first wavelength converting layer 20a between the light-emitting elements 10. The resin material 71 surrounds each of the light-emitting elements 10 in a plan view. At this stage, the resin material 71 can be in an uncured state or in a semi-cured state. The amount of the resin material 71 is determined to be sufficient such that when the supplied resin material 71 is flattened, the upper surface of the resin material 71 is substantially the same height as the upper surfaces 14 of the light-emitting elements 10. Thereafter, the resin material 71 is flattened. At this time, the upper surface of the resin material 71 is substantially coplanar with the upper surfaces of the light-emitting elements 10. Accordingly, a substantially entire portions of the lateral surfaces 15 of each of the light-emitting elements 10 are collectively covered by the first wavelength converting layer of 20a and the resin material 71. Thereafter, the resin material 71 is cured. Accordingly, a first low refractive index layer 70a is formed on the first wavelength converting layer 20a. The first low refractive index layer 70a covers regions of the lateral surfaces 15 near the upper surface 14 of each of the light-emitting elements 10, but does not cover the upper surfaces 14 of the light-emitting elements 10.

Thereafter, as shown in FIG. 4B, a second wavelength converting layer 30a is disposed on the light-emitting elements 10 and the first low refractive index layer 70a. The upper surfaces 14 of the light-emitting elements 10 are in contact with the second wavelength converting layer 30a and covered by the second wavelength converting layer 30a.

Thereafter, steps similar to the steps in the first embodiment shown in FIG. 2F through FIG. 2H are carried out. Accordingly, a plurality of light-emitting devices 2 are obtained.

Next, effects of the second embodiment will be described. In the light-emitting device 2 according to the second embodiment, the second wavelength converting member 30 is spaced farther apart from the electrodes 12 compared to that of the light-emitting device 1 according to the first embodiment. With this arrangement, corrosion of the electrodes 12 can be further reduced or prevented when a KSF-based fluorescent material is used as the wavelength converting material 32.

Further, also in the second embodiment, the first light-transmissive member 70 is located between the first wavelength converting member 20 and the second wavelength converting member 30. Accordingly, the second light L2 which has been converted in the first wavelength converting member 20 is hardly enter the second wavelength converting member 30. Accordingly, the second light L2 is hardly absorbed by the wavelength converting material 32 of the second wavelength converting member 30 such that a high extraction efficiency of the second light L2 can be achieved.

Further, the light emitting device 2 according to the second embodiment has a greater volume of the first wavelength converting member 20 compared to the light-emitting device 1 according to the first embodiment (shown in FIG. 1A), which allows for a reduction in the amount of the wavelength converting material 22 contained in the first wavelength converting member 20. This improves the transmittance of light in the first wavelength converting member 20, and allows an increase of the amount of light propagates through the first wavelength converting member 20 and is extracted from the lateral surfaces of the light emitting device 2.

In the second embodiment, a YAG-based fluorescent material can be used as the wavelength converting material 22 of the first wavelength converting member 20 instead of a β-sialon-based fluorescent material. When a YAG-based fluorescent material is used as the wavelength converting material 22 of the first wavelength converting member 20, the second light L2 will be yellow. It is also possible to use a CASN-based fluorescent material for the wavelength converting material 22, and a β-sialon-based fluorescent material for the wavelength converting material 32. When a CASN based fluorescent material is used as the wavelength converting material 22, and a β-sialon-based fluorescent material is used as the wavelength conversion material 32, the second light L2 will be red and the third light L3 will be green. The above can be applied in a similar manner also to a third embodiment and a fourth embodiment to be described below.

Third Embodiment

Figure 5:
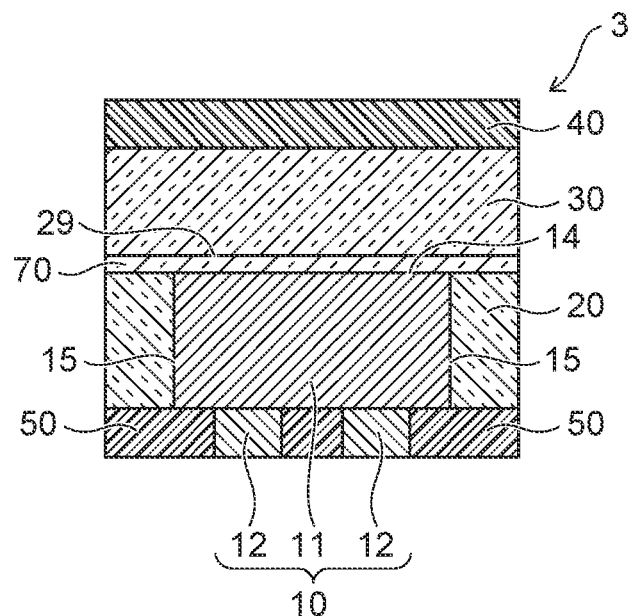
FIG. 5 is a schematic exemplary cross-sectional view showing an exemplary light-emitting device according to a third embodiment of the present disclosure.

FIG. 5 is a schematic exemplary cross-sectional view showing an exemplary light-emitting device according to a third embodiment. As shown in FIG. 5, in the light-emitting device 3 according to the third embodiment, the first wavelength converting member 20 is in contact with substantially the entire portions of the lateral surfaces 15 of the light-emitting element 10. The first light-transmissive member 70 is in contact with the upper surface 14 of the light-emitting element 10. The second wavelength converting member 30 is disposed on the first light-transmissive member 70. Therefore, the second wavelength converting member 30 is spaced apart from the light-emitting element 10 and is not in contact with the light-emitting element 10.

Figure 6A:
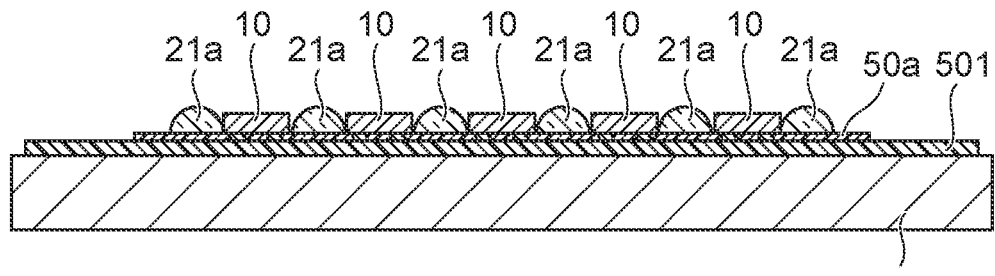
FIG. 6A through FIG. 6C are schematic exemplary cross-sectional views illustrating an exemplary method of manufacturing a light-emitting device according to the third embodiment.
Figure 6B:
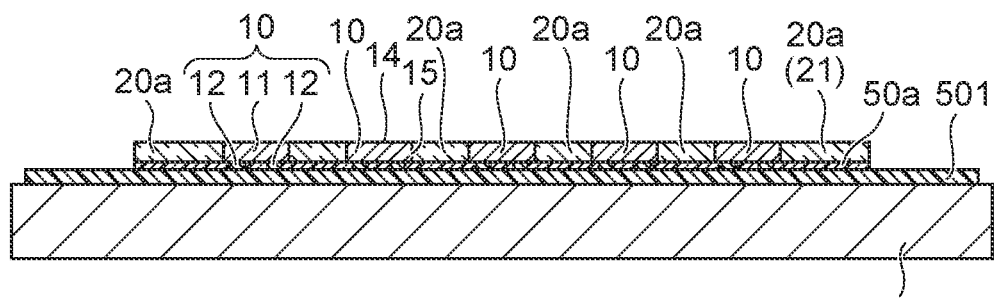
Figure 6C:
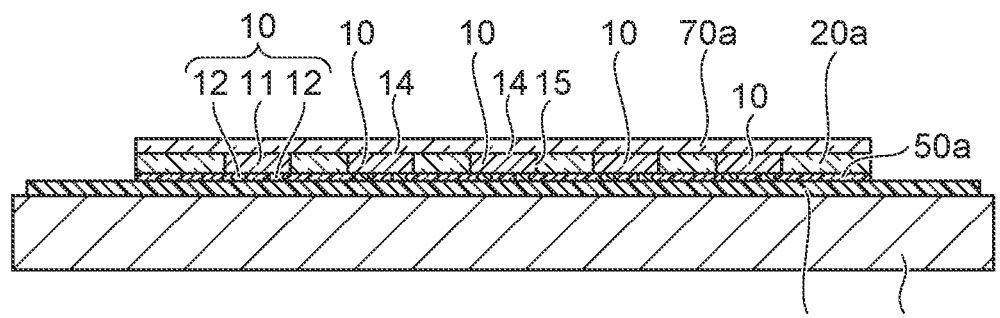

Next, a method of manufacturing the light-emitting device 3 according to the third embodiment will be described. FIG. 6A through FIG. 6C are schematic cross-sectional views illustrating a method of manufacturing the light-emitting device 3 according to the third embodiment. The steps shown in FIG. 2A and FIG. 2B illustrated in the first embodiment are performed.

Thereafter, as shown in FIG. 6A, a resin material 21a containing a wavelength converting material 22 is disposed on the light-reflecting resin layer 50a and between the light-emitting elements 10. The resin material 21a surrounds each of the light-emitting elements 10 in a plan view. At this state, the resin material 21a can be in an uncured state or in a semi-cured state. In this case, the amount of the resin material 21a is determined such that when the applied resin 21a is flattened, the upper surface of the resin material 21a is flash with the upper surfaces 14 of the light-emitting elements 10.

Thereafter, as shown in FIG. 6B, the resin material 21a is flattened. With this, the upper surface of the resin material 21a is made substantially coplanar with the upper surfaces of light-emitting elements 10. Accordingly, substantially the entire portions of the lateral surfaces 15 of the light-emitting elements 10 are covered by the resin material 21a. Thereafter, the resin material 21a is cured. Accordingly, the first wavelength converting layer 20a is formed. The first wavelength converting layer 20a covers substantially the entire portions of the lateral surfaces 15 of the light-emitting elements 10 but does not cover the upper surfaces 14 of the light-emitting elements 10.

Thereafter, as shown in FIG. 6C, a first low refractive index layer 70a is disposed on the light-emitting elements 10 and on the first wavelength converting layer 20a. The upper surfaces 14 of the light-emitting elements 10 are in contact with the first low refractive index layer 70a and is covered by the first low refractive index layer 70a.

Thereafter, steps similar to the steps in the first embodiment shown in FIG. 2E through FIG. 2H are carried out. Accordingly, a plurality of light-emitting devices 3 are obtained.

Next, effects of the third embodiment will be described. In the light-emitting device 3 according to the third embodiment, the interface 29 between the first light-transmissive member 70 and the second wavelength converting member 30 is located above the light-emitting element 10. Therefore, the first light L1 emitted from the light-emitting element 10 is scattered at the interface 29 and is distributed throughout the first wavelength converting member 20 and the second wavelength converting member 30. Accordingly, a light conversion efficiency can be improved. Further, a portion of the first light L1 scattered at the interface 29 propagates in the first light-transmissive member 70 and discharged to the outside of the light-emitting device 3. As a result, a high extraction efficiency of the first light L1 can also be obtained.

Further, the third light-emitting device 3 according to the third embodiment includes the first wavelength converting member 20 that has a volume greater than the first wavelength converting members of the light-emitting device 1 according to the first embodiment (see FIG. 1A) and the light-emitting device 2 according to the second embodiment (see FIG. 3), such that the content of the wavelength converting material 22 contained in the first wavelength converting member 20 can be further reduced. Accordingly, the amount of light propagating in the first wavelength converting member 20 and extracted from the lateral surfaces of the light-emitting device 3 can be increased.

Further, in the light-emitting device 3, the second wavelength converting member 30 is spaced apart from the light-emitting element 10. Therefore, when a KSF fluorescent material is used as the wavelength converting material 32 of the second wavelength converting member 30, dispersion of the potassium ions and fluorine ions from the KSF fluorescent material onto the surfaces of the light-emitting element 10 and reaching the electrodes 12 can be reduced or prevented. Accordingly, corrosion of the electrodes 12 can be further reduced or prevented.

Fourth Embodiment

Figure 7:
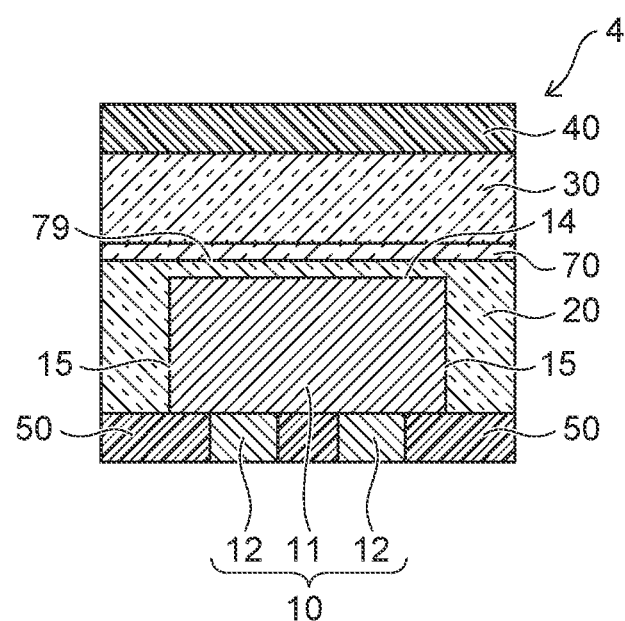
FIG. 7 is a schematic exemplary cross-sectional view showing an exemplary light-emitting device according to a fourth embodiment of the present disclosure.

FIG. 7 is a schematic exemplary cross-sectional view showing an exemplary light-emitting device according to a fourth embodiment. As shown in FIG. 7, in the light emitting device 4 according to the fourth embodiment, the first wavelength converting member 20 is in contact with the lateral surfaces 15 and the upper surface 14 of the light-emitting element 10. The first light-transmissive member 70 is disposed on the first wavelength converting member 20. Therefore, the first light-transmissive member 70 is spaced apart from the light-emitting element 10 and is not in contact with the light-emitting element 10. The second wavelength converting member 30 is disposed on the first light-transmissive member 70. Accordingly, the second wavelength converting member 30 is further spaced apart from the light-emitting element 10 and is not in contact with the light-emitting element 10.

Figure 8A:
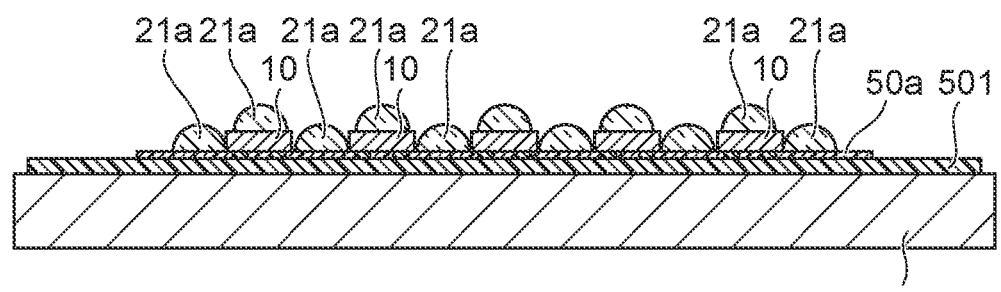
FIG. 8A through FIG. 8C are schematic exemplary cross-sectional views illustrating an exemplary method of manufacturing a light-emitting device according to the fourth embodiment.
Figure 8B:
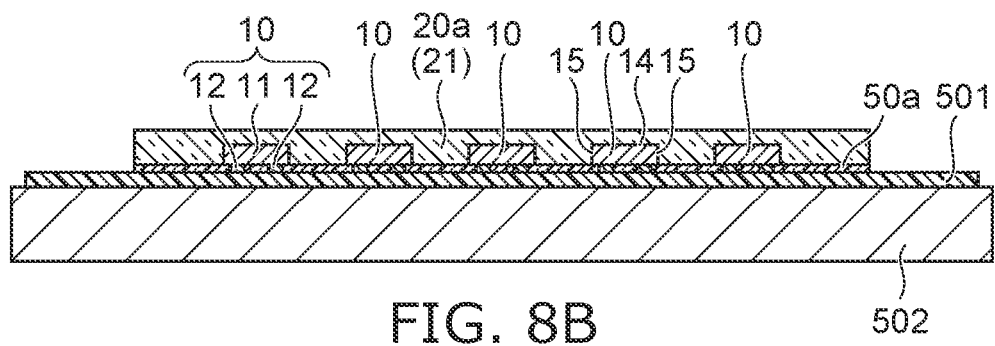
Figure 8C:
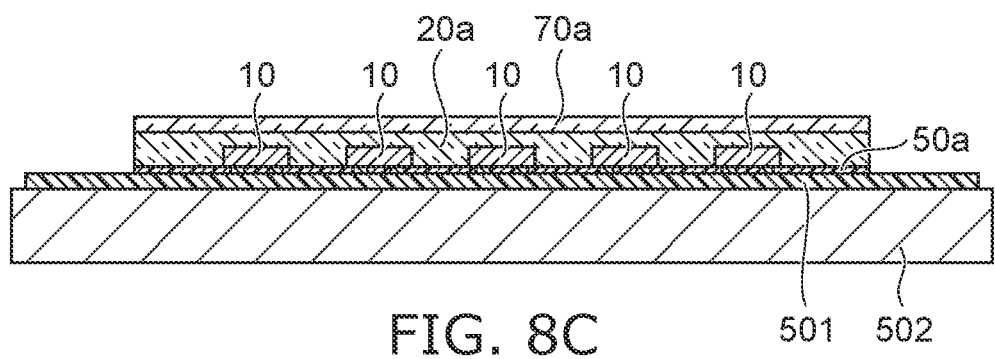

Next, a method of manufacturing the light-emitting device 4 according to the fourth embodiment will be described. FIG. 8A through FIG. 8C are schematic cross-sectional views illustrating a method of manufacturing the light-emitting device according to the fourth embodiment. First, the steps shown in FIG. 2A and FIG. 2B illustrated in the first embodiment are performed.

Thereafter, as shown in FIG. 8A, a resin material 21a containing a wavelength converting material 22 is disposed on the light-emitting elements 10, and on the light-reflecting resin layer 50a and between the light emitting elements 10. The resin material 21a disposed between the light-emitting elements 10 surrounds each light emitting element 10 in a plan view. At this state, the resin material 21a can be in an uncured state or in a semi-cured state. In this case, the amount of the resin material 21a is determined such that when the resin material 21a is flattened, the upper surface of the resin material 21a is located higher than the upper surfaces 14 of the light-emitting elements 10.

Thereafter, as shown in FIG. 8B, the resin material 21a is flattened. By this flattening, the resin material 21a covers the upper surfaces 14 of the light-emitting elements 10 and fills the space between the light-emitting elements 10. Accordingly, the lateral surfaces 15 and the upper surface 14 of the light-emitting element 10 are covered by the resin material 21a. Then the resin material 21a is cured. Accordingly, the first wavelength converting layer 20a is formed. The lateral surfaces 15 and the upper surface 14 of each of the light-emitting elements 10 are covered by the first wavelength converting layer 20a.

Thereafter, as shown in FIG. 8C, the first low refractive index layer 70a is disposed on the first wavelength converting layer 20a. The first low refractive index layer 70a is disposed spaced apart from the light-emitting elements 10 by the first wavelength converting layer 20a, and is not contact with the light-emitting elements 10.

Thereafter, steps similar to the steps in the first embodiment shown in FIG. 2E through FIG. 2H are carried out. Accordingly, a plurality of light-emitting devices 4 are obtained.

Next, effects of the fourth embodiment will be described. In the light emitting device 4 according to the fourth embodiment, the interface 79 between the first wavelength converting member 20 and the first light-transmissive member 70 is located above the light-emitting elements 10. This arrangement allows the first light L1 emitted from the light-emitting elements 10 to enter the interface 79 with a large incident angle, which increases the light refracted in lateral directions. Accordingly, the extraction efficiency of the first light L1 can be improved. Further, both the first wavelength converting member 20 and the second wavelength converting member 30 are in contact with the first light-transmissive member 70 with wide areas, such that the second light L2 emitted from the first wavelength converting member 20 and the third light L3 emitted from the second wavelength converting member 30 can easily be emitted to the outside via the first light-transmissive member 70. Accordingly, extraction efficiencies of the second light L2 and the third light L3 can also be improved.

Fifth Embodiment

Figure 9:
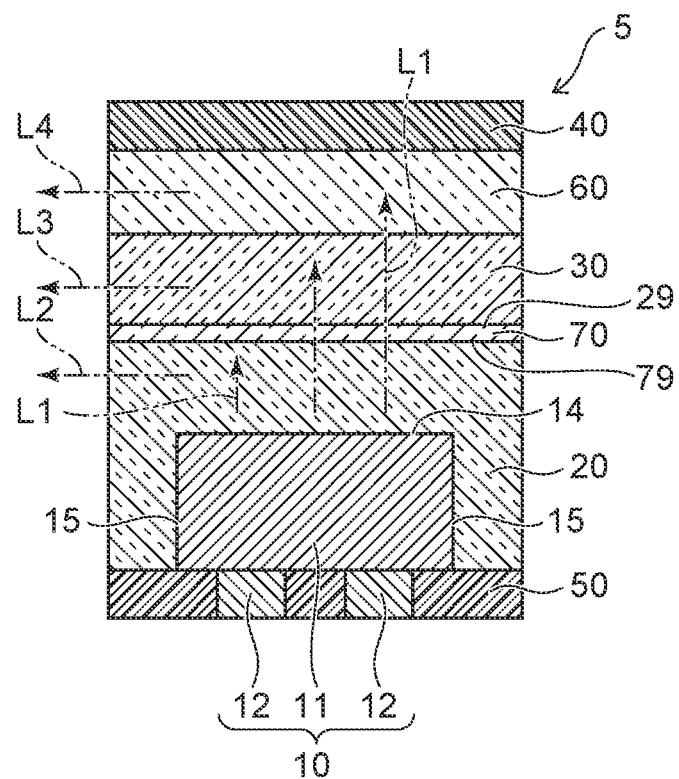
FIG. 9 is a schematic exemplary cross-sectional view showing an exemplary light-emitting device according to a fifth embodiment of the present disclosure.

FIG. 9 is a schematic exemplary cross-sectional view showing an exemplary light-emitting device according to a fifth embodiment. As shown in FIG. 9, in the light-emitting device 5 according to the fifth embodiment, a third wavelength converting member 60 is disposed between the second wavelength converting member 30 and the first light-reflecting member 40, in addition to the structure of the light-emitting device 4 according to the fourth embodiment. The third wavelength converting member 60 includes a light-transmissive resin material as a base material (third base material) and a wavelength converting material (third wavelength converting material) contained in the base material. The third wavelength converting member 60 is configured to absorb the first light L1 emitted from the light emitting element 10 and to emit a fourth light L4 having a fourth peak wavelength. The fourth peak wavelength is different from the first peak wavelength of the first light L1, the second peak wavelength of the second light L2, and the third peak wavelength of the third light L3.

In the light-emitting device 5, the first wavelength converting member 20 covers the lateral surfaces 15 and the upper surface 14 of the light-emitting element 10. The first light-transmissive member 70 is located on the first wavelength converting member 20 and is spaced apart from the light-emitting element 10. The second wavelength converting member 30 is located on the first light-transmissive member 70 and is spaced apart from the light-emitting elements 10 and the first wavelength converting member 20. The third wavelength converting member 60 is located on the second wavelength converting member 30 and is spaced apart from the light-emitting element 10, the first wavelength converting member 20, and the first light-transmissive member 70. The first light-reflecting member 40 is located on the third wavelength converting member 60 and is spaced apart from the light-emitting element 10, the first wavelength converting member 20, the first light-transmissive member 70, and the second wavelength converting member 30.

The third wavelength converting member 60 is exposed at the lateral surfaces of the light-emitting device 5. Accordingly, each of corresponding surfaces of the lateral surfaces of the third wavelength converting member 60, the lateral surfaces of the first wavelength converting member 20, the lateral surfaces of the first light-transmissive member 70, and the lateral surfaces of the second wavelength converting member 30, constitute a continuous light-emission surface.

In the fifth embodiment, for example, the first peak wavelength M of the first light L1 emitted from the light-emitting element 10 is in the ultraviolet region. The second peak wavelength λ2 of the second light L2 emitted from the first wavelength converting member 20 is in the blue region. The third peak wavelength λ3 of the third light L3 emitted from the second wavelength converting member 30 is in the red region. The fourth peak wavelength λ4 of the fourth light L4 emitted from the third wavelength converting member 60 is in the green area. In this case, the relationship between the peak wavelengths can be simply represented as λ1<λ2<λ4<λ3. As represented above, among the second light L2, the third light L3, and the fourth light L4, the light having a shortest peak wavelength is the second light L2. The first light-transmissive member 70 has a refractive index smaller than a refractive index of the base material 21 of the first wavelength converting member 20. Also, the refractive index of the first light-transmissive member 70 is preferably smaller than a refractive index of the base material 31 of the second wavelength converting member 30. A mixture of the second light L2, the third light L3, and the fourth light L4 is emitted from the light-emitting device 5.

Next, effects of the fifth embodiment will be described. According to the fifth embodiment, each of the three colors of light is produced by a corresponding one of the wavelength converting members, such that colors of all the lights can be easily adjusted by adjusting corresponding wavelength converting members. Accordingly, when a planar light source according to the fifth embodiment is used as the backlight of a display device (for example, a liquid crystal display), the color of the image can be adjusted more appropriately.

Further, when the first light-transmissive member 70 has a refractive index smaller than a refractive index of the base material 21 of the first wavelength converting member 20 as in the fifth embodiment, a portion of light propagating from the first wavelength converting member 20 toward the first light-transmissive member 70 tends to be totally reflected at the interface 79. Accordingly, propagation of the second light L2 emitted from the first wavelength converting member 20 through the first light-transmissive member 70 into the second wavelength converting member 30 can be reduced or prevented such that absorption of the second light L2 by the second wavelength converting member 32 can be reduced or prevented.

Also, when the refractive index of the first light-transmissive member 70 is smaller than a refractive index of the base material 31 of the second wavelength converting member 30, a portion of the light progressing from the second wavelength converting member 30 toward the first light-transmissive member 70 tends to be totally reflected at the interface 29. Accordingly, propagation of the third light L3 emitted from the second wavelength converting member 30 through the first light-transmissive member 70 into the first wavelength converting member 20 can be reduced or prevented such that absorption of the third light L3 by the wavelength converting material 22 can be reduced or prevented.

For the wavelength converting material 22 of the first wavelength converting member 20, a CASN-based fluorescent material (for example, $CaAlSiN_3$:Eu) can also be employed. Accordingly, the second light L2 emitted from the first wavelength converting member 20 becomes a red light. In this case, it is preferable to use a β-silaron-based fluorescent material as the wavelength converting material 32 of the second wavelength converting member 30 to obtain green light as the third light L3 emitted from the second wavelength converting member 30. It is also preferable to obtain blue light as the fourth light L4 emitted from the third wavelength converting member 60.

In the fifth embodiment, as described above, the wavelength converting material 22 of the first wavelength converting member 20 is a fluorescent material configured to emit blue light (blue fluorescent material), the wavelength converting material 32 of the second wavelength converting member 30 is a fluorescent material configured to emit red light (red fluorescent material), and the wavelength converting material 62 of the third wavelength converting member 60 is a fluorescent material configured to emit green light (green fluorescent material are illustrated, but other appropriate combination can also be employed. For example, the locations of the blue fluorescent material, the red fluorescent material, and the green fluorescent material can be appropriately determined. In other words, the first wavelength converting member 20 can contain a wavelength converting material 22 of any one of the three types of fluorescent materials; a blue fluorescent material, a red fluorescent material, and a green fluorescent material. The second wavelength converting member 30 can contain a wavelength converting material 22 of one of the three types of the fluorescent materials that is other than the fluorescent material contained in the first wavelength converting member 20. The third wavelength converting member 60 can contain a fluorescent material of the lest one of the three types as its wavelength converting material 62.

Sixth Embodiment

Figure 10A:
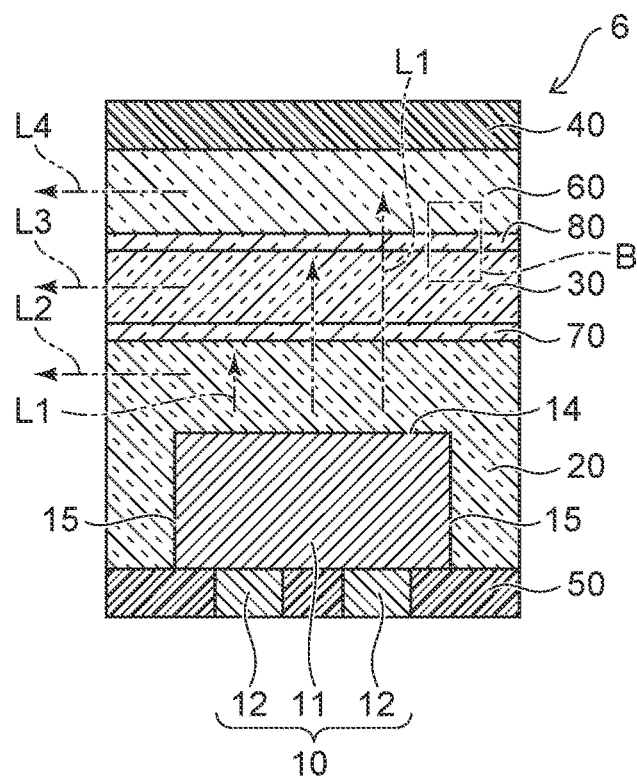
FIG. 10A is a schematic exemplary cross-sectional view showing an exemplary light-emitting device according to a sixth embodiment of the present disclosure.
Figure 10B:
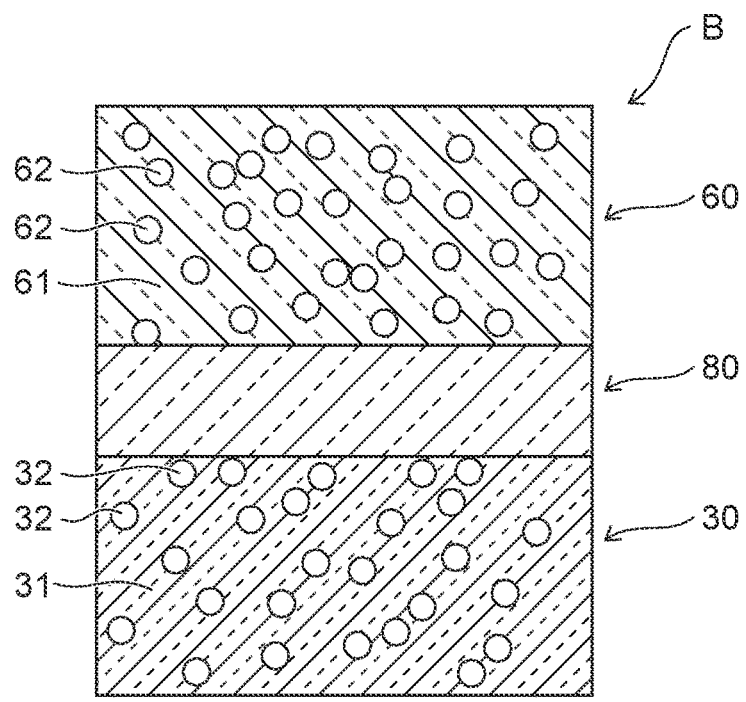
FIG. 10B is an enlarged cross-sectional view of a region B of FIG. 10A.

FIG. 10A is a schematic exemplary cross-sectional view showing an exemplary light-emitting device according to a fifth embodiment. FIG. 10B is an enlarged cross-sectional view of a region B of FIG. 10A.

As shown in FIG. 10A, the light emitting device 6 according to the sixth embodiment includes a second light-transmissive member 80 in addition to the structure of the light-emitting device 5 according to the fifth embodiment. The second light-transmissive member 80 is located between the second wavelength converting member 30 and the third wavelength converting member 60, and is in contact with the second wavelength converting member 30 and the third wavelength converting member 60. The second light-transmissive member 80 is exposed at the lateral surfaces of the light-emitting device 6. Accordingly, each of the lateral surfaces of the second light-transmissive member 80 also constitute a continuous light-emitting surface with a corresponding one of the lateral surfaces of the first wavelength converting member 20, of the first light-transmissive member 70, of the second wavelength converting member 30, and of the third wavelength converting member 60.

As shown in FIG. 10B, the third wavelength converting member 60 includes a light-transmissive resin material 61 and a wavelength converting material 62. The second light-transmissive member 80 can be formed of a cured light-transmissive resin material. The second light-transmissive member 80 does not substantially contain a wavelength converting material.

The second light-transmissive member 80 has a refractive index smaller than a refractive index of the base material 31 of the second wavelength converting member 30 or a refractive index of the base material 61 of the third wavelength converting member 60, which is a refractive index of the base material of the wavelength converting member that emits light with a shorter peak wavelength. For example, when the second wavelength converting member 30 emits the third light L3 in green and the third wavelength converting member 60 emits the fourth light L4 in blue, the refractive index of the second light-transmissive member 80 is smaller than the refractive index of the resin material 61.

The first light-transmissive member 70 has a refractive index smaller than a refractive index of the base material 21 of the first wavelength converting member 20 or a refractive index of the base material 31 of the second wavelength converting member 30, which is a refractive index of the base material of the wavelength converting member that emits light with a shorter peak wavelength. For example, when the first wavelength converting member 20 emits the second light L2 in red and the second wavelength converting member 30 emits the third light L3 in green, the refractive index of the first light-transmissive member 70 is smaller than the refractive index of the resin material 31.

Next, effects of the sixth embodiment will be described. In the sixth embodiment, the first wavelength converting member 20, the second wavelength converting member 30, and the third wavelength converting member 60 are in contact with at least one of the first light-transmissive member 70 and the second light-transmissive member 80, such that the second light L2, the third light L3 and the fourth light L4 can easily reach the lateral surfaces of the light-emitting device 6 via the first light-transmissive member 70 or the second light-transmissive member 80. Accordingly, the light extracting efficiency can be improved.

Further, when the second light-transmissive member 80 has a refractive index smaller than a refractive index of the resin material 61 of the third wavelength converting member 60, the fourth light L4 emitted from the third wavelength converting member 60 is reflected at the interface between the third wavelength converting member 60 and the second light-transmissive member 80, such that entering of the fourth light L4 in the second wavelength converting member 30 can be reduced or prevented. Accordingly, absorption of the fourth light L4 (blue light) by the wavelength converting material 32 (green fluorescent material) can be reduced or prevented. Similarly, when the first light-transmissive member 70 has a refractive index smaller than a refractive index of the resin material 31 of the second wavelength converting member 30, the third light L3 emitted from the second wavelength converting member 30 is reflected at the interface between the second wavelength converting member 30 and the first light-transmissive member 70, such that entering of the third light L3 in the second wavelength converting member 30 can be reduced or prevented. Accordingly, absorption of the third light L3 (green light) by the wavelength converting material 22 (red fluorescent material) can be reduced or prevented. In other words, with the presence of the first light-transmissive member 70 and the second light-transmissive member 80, absorption of light having relatively short wavelength by a wavelength converting material configured to emit light of relatively long wavelength can be reduced or prevented.

As a result, the extraction efficiency of each light can be improved, and also each light can be optically separated and extracted.

Seventh Embodiment

Figure 11:
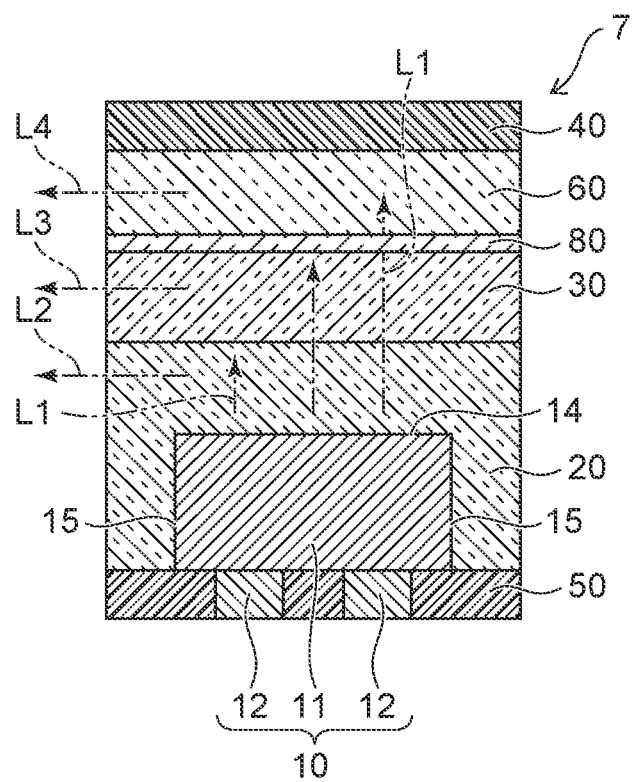
FIG. 11 is a schematic exemplary cross-sectional view showing an exemplary light-emitting device according to a seventh embodiment of the present disclosure.

FIG. 11 is a schematic exemplary cross-sectional view showing an exemplary light-emitting device according to a seventh embodiment. As shown in FIG. 11, compared to the light-emitting device 6 according to the sixth embodiment, the light-emitting device 7 according to the seventh embodiment does not have the first light-transmissive member 70 and the first wavelength converting member 20 is in contact with the second wavelength converting member 30.

Eighth Embodiment

Figure 12:
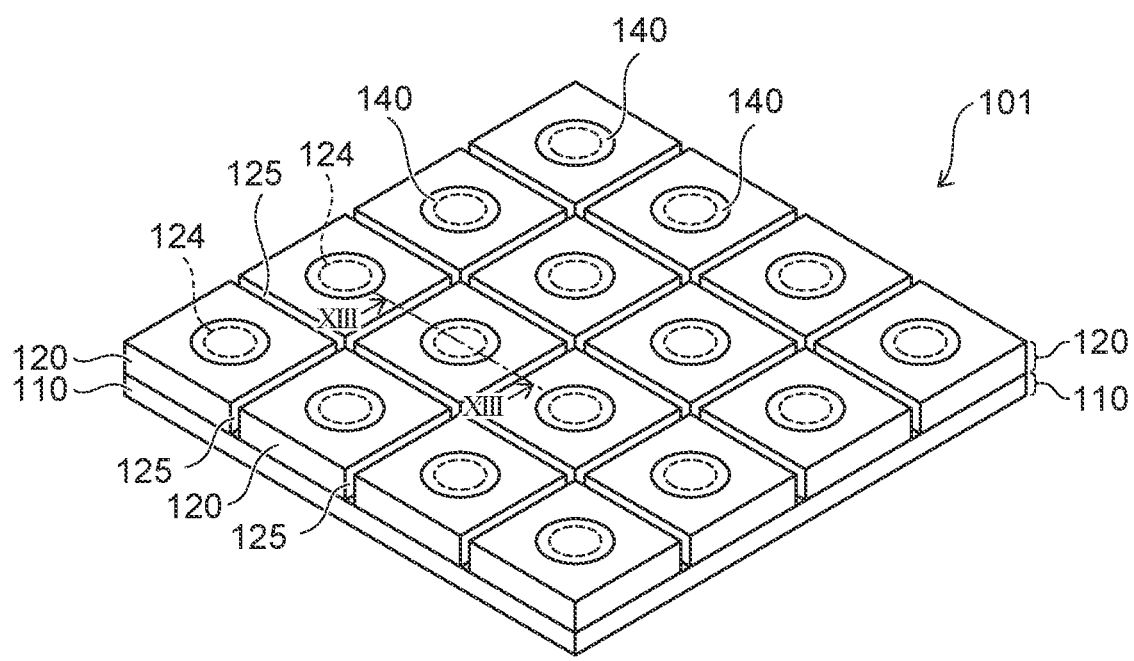
FIG. 12 is a schematic exemplary perspective view showing an exemplary surface-emitting light source according to an eighth embodiment of the present disclosure.
Figure 13:
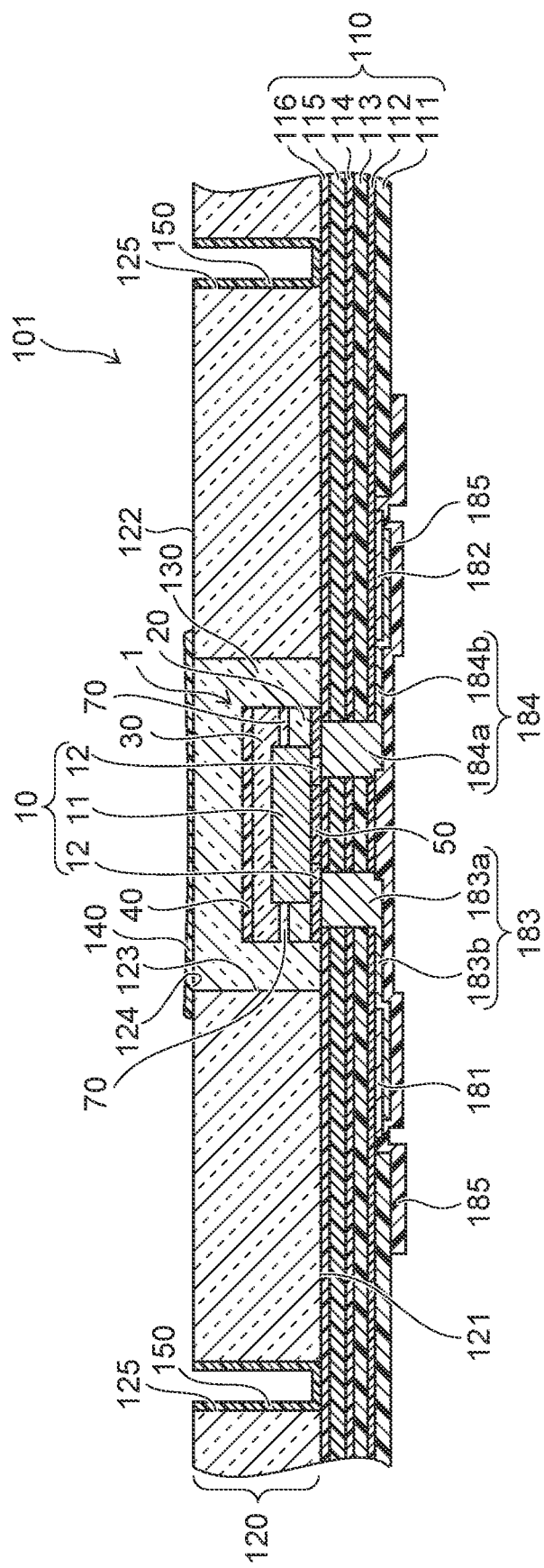
FIG. 13 is a schematic cross-sectional view taken along line XIII-XIII of FIG. 12.

An eighth embodiment illustrates a planar light source containing a plurality of light-emitting devices. FIG. 12 is a schematic exemplary perspective view showing an exemplary planar light source according to the eighth embodiment. FIG. 13 is a schematic cross-sectional view taken along line XIII-XIII of FIG. 12.

As shown in FIG. 12 and FIG. 13, the surface light source 101 according to the eighth embodiment includes a wiring substrate 110, a light-guide plate 120, and a plurality of the light-emitting devices 1.

The light-emitting devices 1 have a substantially similar configuration as described in the first embodiment. Alternative to the light-emitting devices 1 according to the first embodiment, any one of the light-emitting devices 2 to 7 according to the second embodiment to the seventh embodiment can be employed, or a plurality of types of the light-emitting devices can be employed.

The light guide plate 120 is disposed on the wiring substrate 110. The light guide plate 120 has a principal surface 121 (lower surface) facing the wiring substrate 110 and a principal surface of 122 (upper surface) located at a side facing away from the wiring board 110. The light guide plate 120 is formed with a plurality of holes 123. In the eighth embodiment, the holes 123 penetrate through the light-guide plate 120 in a thickness direction. Each of the holes 123 is formed with an opening 124 in the principal surface 122 (upper surface) of the light-guide plate 120. Note that the holes 123 do not have to penetrate through the light-guide plate 120 as described below. Each of the light-emitting devices 1 is located inside each of the holes 123. The holes 123 are formed in a shape of, for example, a cylindrical prism shape, a quadrangular prism shape, or a quadrangular prism shape with rounded corners. The lateral surface(s) defining the holes 123 can be perpendicular or inclined relative to the principal surfaces.

As shown in FIG. 13, a third light-transmissive member 130 covering the light-emitting device 1 is disposed in each of the holes 123. The third light-transmissive member 130 can be formed of an epoxy resin or silicone resin, for example. The third light-transmissive member 130 may or may not contain a wavelength converting material.

The surface light source 101 has a plurality of second light-reflecting members 140 respectively covering a corresponding one of the openings 124. Each of the second light-reflecting member 140 is configured to reflect a portion of light emitted from a corresponding one of the light-emitting devices 1 and to transmit a portion of different portion of light emitted from the light-emitting device 1. The second light-reflecting members 140 are formed, for example, in a circular shape in a plan view. A peripheral portion of each of the second light-reflecting members 140 is located on the light-guide plate 120. A center portion of each of the second light-reflecting members 140 is located on each corresponding one of the third light-transmissive members 130. Each of the second light-reflecting member 140 can be located only on each corresponding one of the third light-transmissive members 130.

The light guide plate 120 is formed with a demarcating groove 125 surrounding each of the light-emitting devices 1 in a plan view. In a plane view, the demarcating groove 125 is formed in a lattice shape. The demarcating groove 125 can be formed penetrate through the light-guide plate 120 in the thickness direction, can be formed only in the principal surface 122 side, or can be formed only in the principal surface 121 side. FIG. 12 and FIG. 13 illustrate a demarcating groove 125 that penetrates through the light-guide plate 120. The lateral surfaces defining the demarcating groove 125 can be perpendicular with respect to the principal surfaces or can be formed with one or more steps. When one or more steps are formed on the lateral surfaces of the demarcating groove 125, opening of the demarcating groove can be wider at the principal surface 122 side than at the principal surface 121 side or can be wider at the principal surface 121 side than at the principal surface 122 side. FIG. 12 and FIG. 13 illustrate a demarcating groove 125 defined by lateral surfaces perpendicular to the principal surfaces. A demarcating member 150 is disposed along the surfaces defining the demarcating groove 125. The material of the demarcating member 150 can be, for example, a resin containing a light-diffusing material or a metal.

Each of the light emitting devices 1 is electrically connected to the wiring substrate 110. The wiring substrate 110 includes a layered structure in which, a first covering layer 111, a support layer 112, a second covering layer 113, a first adhesive sheet 114, a light-reflecting sheet 115, and the second adhesive sheet 116 are layered in this order from the bottom to the top. The second adhesive sheet 116 is in contact with the principal surface 121 (lower surface) of the light-guide plate 120. In the area directly below and around the light-emitting device 1, the first covering layer 111 is not disposed and the support layer 112 is exposed.

In the areas where the support layer 112 is exposed, a first wiring layer 181 and a second wiring layer 182 are disposed on a lower surface of the support layer 112. Further, a first wiring member 183 that connects the first wiring layer 181 to one of the electrodes 12 of the light-emitting device 1 is disposed and a second wiring member 184 that connects the second wiring layer 182 to the other electrode 12 of the light-emitting device 1 is disposed in the area where the support layer 112 is exposed.

The first wiring member 183 includes a first portion 183a and a second portion 183b. The first portion 183a penetrates through the support layer 112, the second covering layer 113, the first adhesive sheet 114, the light-reflecting sheet 115, and the second adhesive sheet 116 and is electrically in contact with the one of the electrodes 12. The second portion 183b covers the lower surface of the first portion 183a and the lower surface of the first wiring layer 181, and connects the first portion 183a to the first wiring layer 181. In a similar manner, the second wiring member 184 includes a third portion 184a and a fourth portion 184b. The third portion 184a penetrates through the support layer 112, the second covering layer 113, the first adhesive sheet 114, the light-reflecting sheet 115, and the second adhesive sheet 116 and is in contact with the other electrode 12. The fourth portion 184b covers the lower surface of the third portion 184a and the lower surface of the second wiring layer 182, and connects the third portion 184a to the second wiring layer 182. The first wiring member 183 and the second wiring member 184 can be formed by curing an electrically conductive paste.

The wiring substrate 110 is provided with a covering layer 185. The covering layer 185 covers the lower surface of the exposed area of the support layer 112, the lower surface of the first wiring layer 181, the lower surface of the second wiring layer 182, the lower surface of the second portion 183b, the lower surface of the fourth portion 184b, and the lower surface of the first covering layer 111 near the exposed area of the support layer 112.

Next, operation of the surface light source according to the eighth embodiment will be described. As shown in FIG. 13, the light emitted from the light-emitting device 1 enters the light-guide plate 120 through the third light-transmissive member 130, propagates in an approximately horizontal direction in the light-guide plate 120, and is emitted from the principal surface 122 (upper surface) of the light-guide plate 120.

Next, effects of the eighth embodiment will be described. The surface light source 101 can be used, for example, as a backlight of a display device. In such a case, it is preferable that the light emitted from the surface light source 101 contains light that can efficiently pass through each color filter of the display device. Determining the first peak wavelength of the first light L1, the second peak wavelength of the second light L2, and the third peak wavelength of the third light L3 respectively to the wavelengths that can be transmitted efficiently through the color filters of the display device, optical utilization efficiency of the display device can be improved.

Further, as described in the first embodiment, the light-emitting device 1 exhibits a high extraction efficiency of the second light L2 and the third light L3 from the lateral surfaces 1S. Moreover, portions of the second light L2 and the third light L3 emitted in an approximately horizontal direction tend to propagate further in the light-guide plate 120. Accordingly, the surface light source 101 exhibits high uniformity in the light emitted from the principal surface 122 (upper surface) of the light-guide plate 120.

Ninth Embodiment

Figure 14:
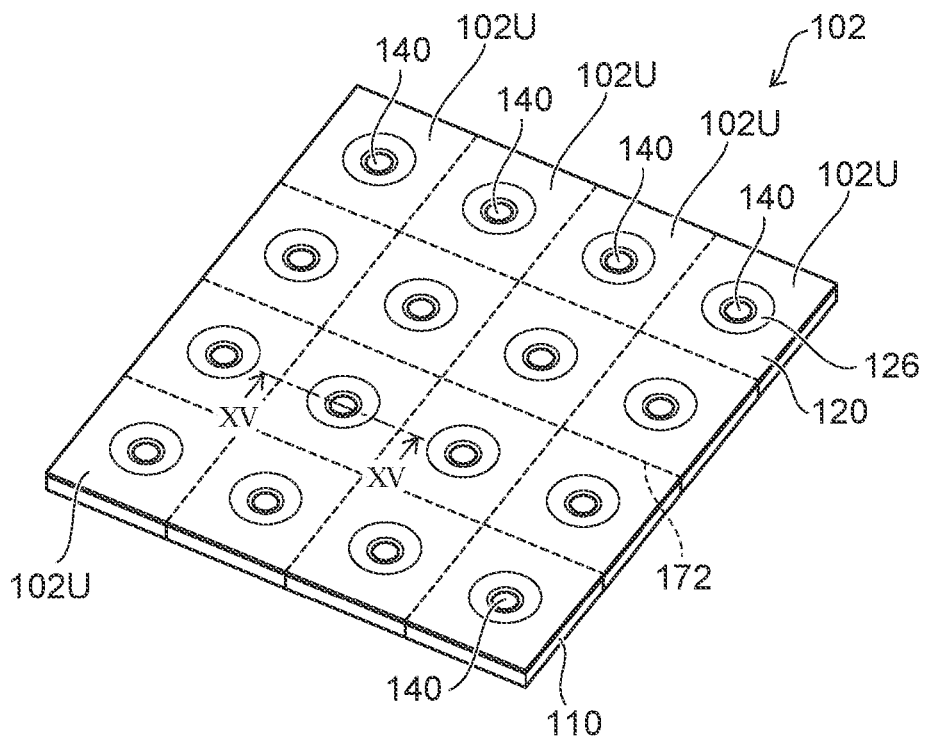
FIG. 14 is a schematic exemplary perspective view showing an exemplary surface-emitting light source according to a ninth embodiment of the present disclosure.
Figure 15:
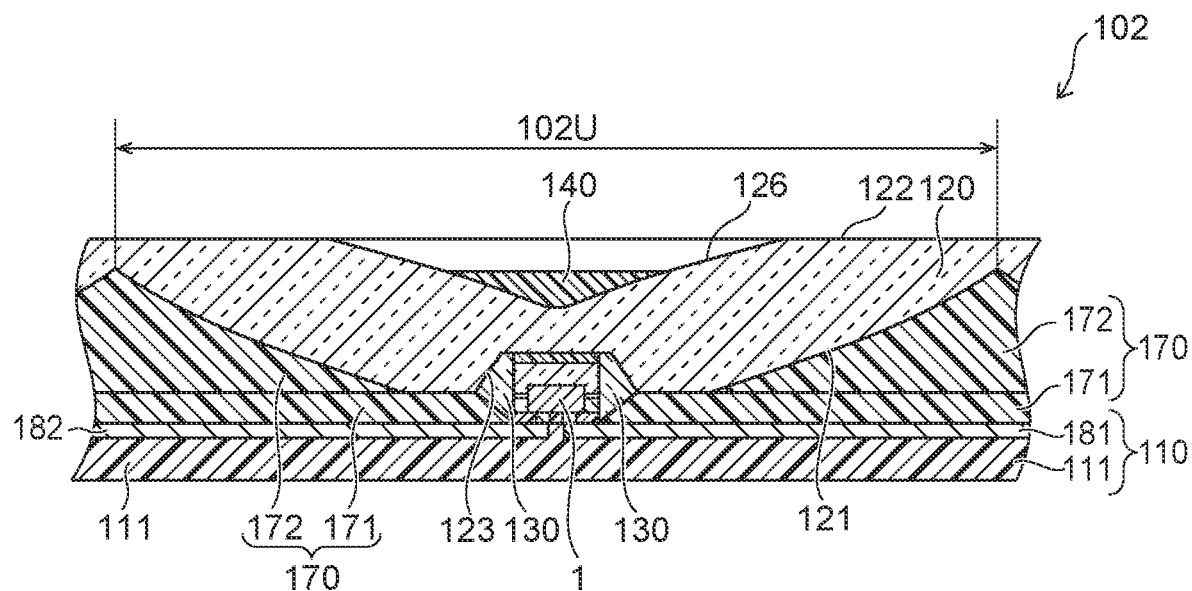
FIG. 15 is a schematic cross-sectional view taken along line XV-XV of FIG. 14.

The ninth embodiment also illustrates a surface-like light source. FIG. 14 is a schematic exemplary perspective view showing an exemplary planar light source according to the ninth embodiment. FIG. 15 is a schematic cross-sectional view taken along line XV-XV of FIG. 14.

As shown in FIG. 14 and FIG. 15, the surface light source 102 according to the ninth embodiment includes a third light-reflecting member 170 between the wiring substrate 110 and the light-guide plate 120. Further, the holes 123 of the light guide plate 120 are formed only in the principal surface 121 (lower surface) of the light-guide plate 120 and do not penetrate through the light-guide plate 120. The light-emitting devices 1 are disposed in the holes 123, respectively. The light-emitting devices 1 have a configuration similar to that in the light-emitting devices 1 according to the first embodiment. In the light emitting devices 1 according to the ninth embodiment, a first wiring layer 181 and a second wiring layer 182 of a wiring substrate 110 are electrically connected to corresponding electrodes of the light-emitting element 10 of the light-emitting device 1.

The third light-reflecting member 170 includes a first part 171 disposed around the lower portion of the light-emitting device 1, and a second part disposed on the first part 172. For example, the first part 171 and the second part 172 are formed of a same material. The first part 171 is disposed on an entire upper surface of the wiring substrate 110 of the surface light source 102 except for the portions under the light-emitting devices 1. The second part 172 surrounds the light emitting devices 1 and also being spaced apart from the light-emitting devices 1. As shown in the cross-sectional view in FIG. 15, a height of the second part 172 with respect to the first part 171 increases as an increasing a distance from each of the light-emitting devices 1, and ridge lines are formed between adjacent light-emitting devices 1. With this arrangement, the upper surface of the third light-reflecting member 170 includes concave surfaces each surrounding a corresponding one of the light-emitting devices 1. The light emitting regions 102U are demarcated from one another by the ridge lines of the second part 172.

The principal surface 121 (lower surface) of the light-guide plate 120 is curved corresponding to the shape of the second part 172 of the third light-reflecting member 170. Further, a recess 126 is formed in each region of the principal surface 122 (upper surface) of the light-guide plate 120, corresponding to a region directly above each of the holes 123. A second light-reflecting member 140 is disposed in each of the recesses 126. The second light-reflecting members 140 have, for example, an inverse cone shape. The shape of the second light-reflecting members 140 can be appropriately determined. The end portion of each of the second light-reflecting member 140 facing a corresponding one of the light-emitting devices 1 does not have to be sharp. The end portions can be in a flat surface shape or a curved surface shape.

Also in the ninth embodiment, in place of the light-emitting device 1 according to the first embodiment, one type of the light-emitting device among the light-emitting devices 2-7 according to the second embodiment to the seventh embodiment can be employed as the light-emitting devices. A plural types of the light-emitting devices may also be employed in combination.

Materials of Component Members

Next, examples of materials of component members of the surface light source according to the embodiments described above will be illustrated.

The semiconductor layered structure 11 can have at least one light-emitting layer configured to emit light of color as described above. For example, the semiconductor layered structure 11 can include a light emitting layer that is configured to emit a single color of light between an n-type semiconductor layer and a p-type semiconductor layer.

The light-emitting layer can have a structure such as a double-heterostructure or a single quantum well structure (SQW) having a single active layer, or a structure with a group of active layers, such as a multiple quantum well structure (MQW). The light-emitting layer is configured to emit visible light or ultraviolet light. The semiconductor layered structure 11 including a light-emitting layer can include, for example, layers of $In_xAl_yGa_{1-x-y}N$ ($0 \leq x$, $0 \leq y$, $x+y \leq 1$).

The semiconductor layered structure 11 can include one or more light-emitting layers between the n-type semiconductor layer and the p-type semiconductor layer, or can include a plurality of layered structure in which the n-type semiconductor layer, the light-emitting layer, and the p-type semiconductor layer are layered in this order, multiple times. When the semiconductor layered structure 11 includes a plurality of light-emitting layers, two or more light-emitting layers having different peak emission wavelengths may be included or two or more light-emitting layers having the same peak wavelength may be included. In the present specification, the term "same peak emission wavelength" refers to inclusion of variations of about several nanometers. A combination of the peak emission wavelengths among a plurality of light-emitting layers can be appropriately designed. For example, when the semiconductor layered structure 11 includes two light-emitting layers, the light-emitting layers can be selected based on an intended combination of emission colors such as blue light and blue light, green light and green light, red light and red light, ultraviolet light and ultraviolet light, blue light and red light, or green light and red light. Each light-emitting layer may include a plurality of active layers having different peak emission wavelengths one another, or may include a plurality of active layers having the same peak emission wavelength.

Fluorescent materials can be used as a wavelength converting material 22 of the first wavelength converting member 20, a wavelength converting material 32 of the second wavelength converting member 30, and a wavelength converting material of the third wavelength converting member 60. Examples of such fluorescent materials include nitride-based fluorescent materials such as yttrium aluminum garnet-based fluorescent materials (for example, $Y_3(Al, Ga)_5O_{12}$:Ce), lutetium aluminum garnet-based fluorescent materials (for example, $Lu_3(Al, Ga)_5O_{12}$:Ce), terbium aluminum garnet-based fluorescent materials (for example, $Tb_3(Al, Ga)_5O_{12}$:Ce), β-sialon-based fluorescent materials (for example, $(Si, Al)_3(O, N)_4$:Eu), α-sialon-based fluorescent materials (for example, $Mz(Si, Al)_2(O, N)_{16}$ (where $0<z\leq2$), M is a lanthanide element other than La and Ce), CASN-based fluorescent materials (such as $CaAlSiN_3$:Eu), and SCASN-based fluorescent materials (for example, (Sr, Ca) $AlSiN_3$:Eu), fluoride-based fluorescent materials such as KSF-based fluorescent materials (for example, $K_2SiF_6$:Mn), KSAF-based fluorescent materials such as $K_2(Si, Al)F_6$:Mn), and MGF-based fluorescent materials (for example, $3.5MgO.0.5MgF_2.GeO_2$:Mn), fluorescent materials having a perovskite structure (for example, $CsPb(F, Cl, Br, I)_3$), and quantum dot fluorescent materials (for example, CsSe, InP, $AgInS_2$, and $AgInSe_2$). For the wavelength converting material, a single type of fluorescent material can be used or more than one type of fluorescent materials can be used.

The first light-reflecting member 40, the second light-reflecting member 140, the third light-reflecting member 170 can be formed of a resin material that contains a light-diffusing material. It is preferable that a resin material containing a light-diffusing material plastic containing the light diffuser material appears white as a whole. Examples of the resin materials include a silicone resin and an epoxy resin. Examples of the light-diffusing materials include titania, silica, alumina, zinc oxide, and a glass. Such light-reflecting members exhibit a reflectance of 60% or greater to light emitted from the light-emitting device. The contents of the light-diffusing material in the first light-reflecting member 40, the second light-reflecting member 140, and the third light-reflecting member 170 can be the same or different.

The light-guide plate 120 can be formed of a light-transmissive material. Examples of the material of the light-guide plate 120 include thermoplastic resins such as acrylic resin, polycarbonate resin, cyclic polyolefin resin, polyethylene terephthalate resin, or polyester resin, thermosetting resins such as epoxy resin or silicone resin, and glass.

The light-emitting device and the surface-emitting light source according to certain embodiments of the present disclosure can be used, for light sources of lighting devices and display devices.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A surface-emitting light source comprising:
   a light-guide plate defining at least one hole which penetrates the light-guide plate;
   a light-emitting device being located in the at least one hole;
   a third light-transmissive member being disposed in the at least one hole and covering the light-emitting device; and
   a second light-reflecting member covering an opening of the at least one hole,
   the light-emitting device comprising
      a light-emitting element configured to emit a first light having a first peak wavelength,
      a first wavelength converting member being in contact with a lateral surface of the light-emitting element, the first wavelength converting member comprising
         a first base material and
         a first wavelength converting material arranged in the first base material and configured to absorb a portion of the first light and emit a second light having a second peak wavelength that is different from the first peak wavelength,
      a second wavelength converting member comprising
         a second base material and
         a second wavelength converting material arranged in the second base material and configured to absorb a portion of the first light and emit a third light having a third peak wavelength that is different from the first peak wavelength and the second peak wavelength, and
      a first light-transmissive member located between the first wavelength converting member and the second wavelength converting member,
   wherein a refractive index of the first light-transmissive member is smaller than a refractive index of the first base material and the second peak wavelength is shorter than the third peak wavelength, or the refractive index of the first light-transmissive member is smaller than a refractive index of the second base material and the third peak wavelength is shorter than the second peak wavelength;
   wherein a lateral surface of the first wavelength converting member, a lateral surface of the first light-transmissive member, and a lateral surface of the second wavelength converting member constitute a continuous light-emitting surface,
   wherein the third light-transmissive member contacts the first wavelength converting member, the second wavelength converting member, the first light-transmissive member, the second light-reflecting member and the light-guide plate, and
   wherein a peripheral portion of the second light-reflecting member is located on the light-guide plate.

2. The light-emitting device according to claim 1, wherein the first wavelength converting material is configured to absorb the third light.

3. The light-emitting device according to claim 1, wherein the first wavelength converting material is a CASN-based fluorescent material and the second wavelength converting material is a ß-sialon-based fluorescent material.

4. The light-emitting device according to claim 1, wherein the first light-transmissive member is substantially free of a wavelength converting material.

5. The light-emitting device according to claim 1, wherein the second wavelength converting member is disposed on the light-emitting element.

6. The light-emitting device according to claim 5, wherein the first light-transmissive member is in contact with the lateral surface of the light-emitting element, and the second wavelength converting member is in contact with the lateral surface and an upper surface of the light-emitting element.

7. The light-emitting device according to claim 5, wherein the first light-transmissive member is in contact with the lateral surface of the light-emitting element, and the second wavelength converting member is in contact with an upper surface of the light-emitting element.

8. The light-emitting device according to claim 5, wherein the first light-transmissive member is in contact with an upper surface of the light-emitting element, and the second wavelength converting member is spaced apart from the light-emitting element.

9. The light-emitting device according to claim 5, wherein the first wavelength converting member is also in contact with an upper surface of the light-emitting element and the first light-transmissive member is spaced apart from the light-emitting element.

10. The light-emitting device according to claim 1, wherein the first peak wavelength is in a visible light range.

11. The light-emitting device according to claim 1, further comprising a third wavelength converting member that comprises
a third base material and
a third wavelength converting material arranged in the third base material and configured to absorb the first light and emit a fourth light having a fourth peak wavelength that is different from the first peak wavelength, the second peak wavelength, and the third peak wavelength;
wherein the third wavelength converting member is located on or above the second wavelength converting member, and
wherein the continuous light-emitting surface also includes a lateral surface of the third wavelength converting member.

12. The light-emitting device according to claim 11 further comprising a second light-transmissive member located between the second wavelength converting member and the third wavelength converting member,
wherein a refractive index of the second light-transmissive member is smaller than a refractive index of the second base material and the third peak wavelength is shorter than the fourth peak wavelength, or the refractive index of the second light-transmissive member is smaller than a refractive index of the third base material and the fourth peak wavelength is shorter than the third peak wavelength; and
wherein the continuous light-emitting surface also includes a lateral surface of the second light-transmissive member.

13. The light-emitting device according to claim 11, wherein the first peak wavelength is in an ultraviolet light range, the second peak wavelength is in a red light range, the third peak wavelength is in a green light range, and the fourth peak wavelength is in a blue light range.

14. The light-emitting device according to claim 1, further comprising a first light-reflecting member located on the second wavelength converting member and at least directly above the light-emitting element.

15. The surface-emitting light source according to claim 1, wherein:
a plurality of the light-emitting devices are provided,
the at least one hole of the light-guide plate defining a plurality of holes;
wherein each of the plurality of light-emitting devices is located in a corresponding one of the plurality of holes.

16. The surface-emitting light source according to claim 15, further comprising a wiring substrate electrically connected to each of the plurality of the light-emitting devices, and the light-guide plate is located on the wiring substrate.

17. The surface-emitting light source according to claim 15, wherein the light-guide plate defines demarcating grooves surrounding each of the plurality of the light-emitting devices.

18. The light-emitting device according to claim 1, wherein each one of corresponding surfaces of lateral surfaces of the first wavelength converting member, lateral surfaces of the first light-transmissive member, and the lateral surfaces of the second wavelength converting member constitute a continuous light-emitting surface.

* * * * *